(12) United States Patent
Zhou et al.

(10) Patent No.: US 11,728,850 B2
(45) Date of Patent: Aug. 15, 2023

(54) TECHNIQUES FOR INDICATING A PANEL IDENTIFIER IN REPORTING RECEIVED BEAMS

(71) Applicant: QUALCOMM Incorporated, San Diego, CA (US)

(72) Inventors: Yan Zhou, San Diego, CA (US); Tianyang Bai, Somerville, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/498,563

(22) Filed: Oct. 11, 2021

(65) Prior Publication Data

US 2022/0116080 A1 Apr. 14, 2022

Related U.S. Application Data

(60) Provisional application No. 63/090,559, filed on Oct. 12, 2020.

(51) Int. Cl.
*H04B 7/0417* (2017.01)
(52) U.S. Cl.
CPC ................. *H04B 7/0417* (2013.01)
(58) Field of Classification Search
CPC .................................................. H04B 7/0417
USPC ........................................................ 375/267
See application file for complete search history.

(56) References Cited

U.S. PATENT DOCUMENTS

| | | | |
|---|---|---|---|
| 2020/0244317 A1* | 7/2020 | Wu | H04B 7/024 |
| 2020/0366339 A1* | 11/2020 | Gao | H04W 72/0413 |
| 2021/0288711 A1* | 9/2021 | Cao | H04B 7/0404 |
| 2021/0336737 A1* | 10/2021 | Li | H04B 17/318 |

FOREIGN PATENT DOCUMENTS

WO 2019193581 A2 10/2019

OTHER PUBLICATIONS

International Search Report and Written Opinion—PCT/US2021/054602—ISA/EPO—dated Feb. 10, 2022.
Vivo: "Further Discussion on Multi-Beam Operation", 3GPP Draft, 3GPP TSG RAN WG1 #98, R1-1908167_Further Discussion on Multi-Beam Operation, 3rd Generation Partnership Project (3GPP), Prague, CZ, Aug. 26, 2019-Aug. 30, 2019(Aug. 17, 2019), XP051764736, 12 Pages, Retrieved from the Internet: URL: http://www.3gpp.org/ftp/tsg_ran/WG1_RL1/TSGR1_98/Docs/R1-1908167.zip [retrieved on Aug. 17, 2019] Paragraph [3.ULpanelspecifictransmission].

* cited by examiner

*Primary Examiner* — Lihong Yu
(74) *Attorney, Agent, or Firm* — Arent Fox, LLP/Qualcomm

(57) ABSTRACT

Aspects described herein relate to communicating a beam report that includes beam measurements performed by one or more antenna panels and an identifier of the one or more antenna panels. The beam report may be used to determine a number of antenna panels supported by a user equipment (UE) transmitting the beam report, which may be used in configuring the UE for communicating with one or more other devices.

38 Claims, 10 Drawing Sheets

TECHNIQUES FOR INDICATING A PANEL IDENTIFIER IN REPORTING RECEIVED BEAMS

CLAIM OF PRIORITY UNDER 35 U.S.C. § 119

The present Application for Patent claims priority to Provisional Patent Application No. 63/090,559, entitled "TECHNIQUES FOR INDICATING A PANEL IDENTIFIER IN REPORTING RECEIVED BEAMS" filed Oct. 12, 2020, which is assigned to the assignee hereof and hereby expressly incorporated by reference herein for all purposes.

TECHNICAL FIELD

The present disclosure relates generally to wireless communication systems, and more particularly, to techniques for receiving and reporting multiple beams using one or more antenna panels.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communication systems may support beamforming where a first device (for example, a base station or a user equipment (UE)) may beamform communication signals by selectively combining antenna elements in an antenna array to generate a signal transmission or signal reception in a spatial direction of a second device. The two devices may perform beam training procedures such that each device may select or otherwise determine a beam for transmitting signals or communications to the other device or receiving signals or communications from the other device. For example, in a typical beam training operation, a base station may transmit multiple transmit beams to a UE, and the UE may receive each transmit beam using each of multiple receive beams. The UE may perform measurements using the multiple receive beams for a given transmit beam. The UE may transmit a beam report to the base station that indicates the measurements for each of the transmit beams received using each of the receive beams. The base station or UE may use this information to determine a beam to use for subsequent communications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects of the disclosure, a method, a computer-readable medium, and an apparatus are provided. In some aspects, the method includes determining a configuration of one or more antenna panels to use to measure a plurality of downlink beams from a base station, receiving, from the base station, the plurality of downlink beams at the one or more antenna panels, performing a measurement of a signal metric of each downlink beam of the plurality of downlink beams received from the base station using each of the one or more antenna panels, and transmitting, to the base station, a beam report including, for each downlink beam of the plurality of downlink beams, the signal metric measured of the downlink beam and an antenna panel identifier of one of the one or more antenna panels used to measure the downlink beam.

In another aspect, a method includes transmitting, to a user equipment (UE), a plurality of downlink beams, and receiving, from the UE, a beam report including, for each downlink beam of the plurality of downlink beams, a signal metric measured of the downlink beam and an antenna panel identifier of one of one or more antenna panels at the UE used to measure the downlink beam.

In another aspect, a method includes receiving, from a base station, a configuration indicating a set of multiple antenna panels, of a plurality of antenna panels associated with the UE, with which to perform measurements of a plurality of downlink beams, receiving, from the base station, the plurality of downlink beams, each of the plurality of downlink beams being concurrently received by one or more antenna panels of the set of multiple antenna panels, performing, based on the configuration, one or more measurements of each of the received plurality of downlink beams, and transmitting, to the base station, a beam report including, for each of the plurality of downlink beams, the one or more measurements of the downlink beam and one or more antenna panel identifiers that respectively indicate the one or more antenna panels over which the downlink beam is received.

In another aspect, a method includes transmitting, to a UE, a plurality of downlink beams, wherein the plurality of downlink beams correspond to downlink beams that may be concurrently received using the one or more antenna panels, receiving, from the UE, a beam report including, for each downlink beam of the plurality of downlink beams, a signal metric measured of the downlink beam and an antenna panel identifier of one of one or more antenna panels at the UE used to measure the downlink beam, and transmitting, to the UE and based on the beam report, an indication of one or more parameters to use for uplink transmissions from at least one of the one or more antenna panels To the accomplishment of the foregoing and related ends, the one or more aspects comprise the features hereinafter fully described and particularly pointed out in the claims. The following description and the annexed drawings set forth in detail some illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

Like reference numbers and designations in the various drawings indicate like elements.

DETAILED DESCRIPTION

Figure 1:
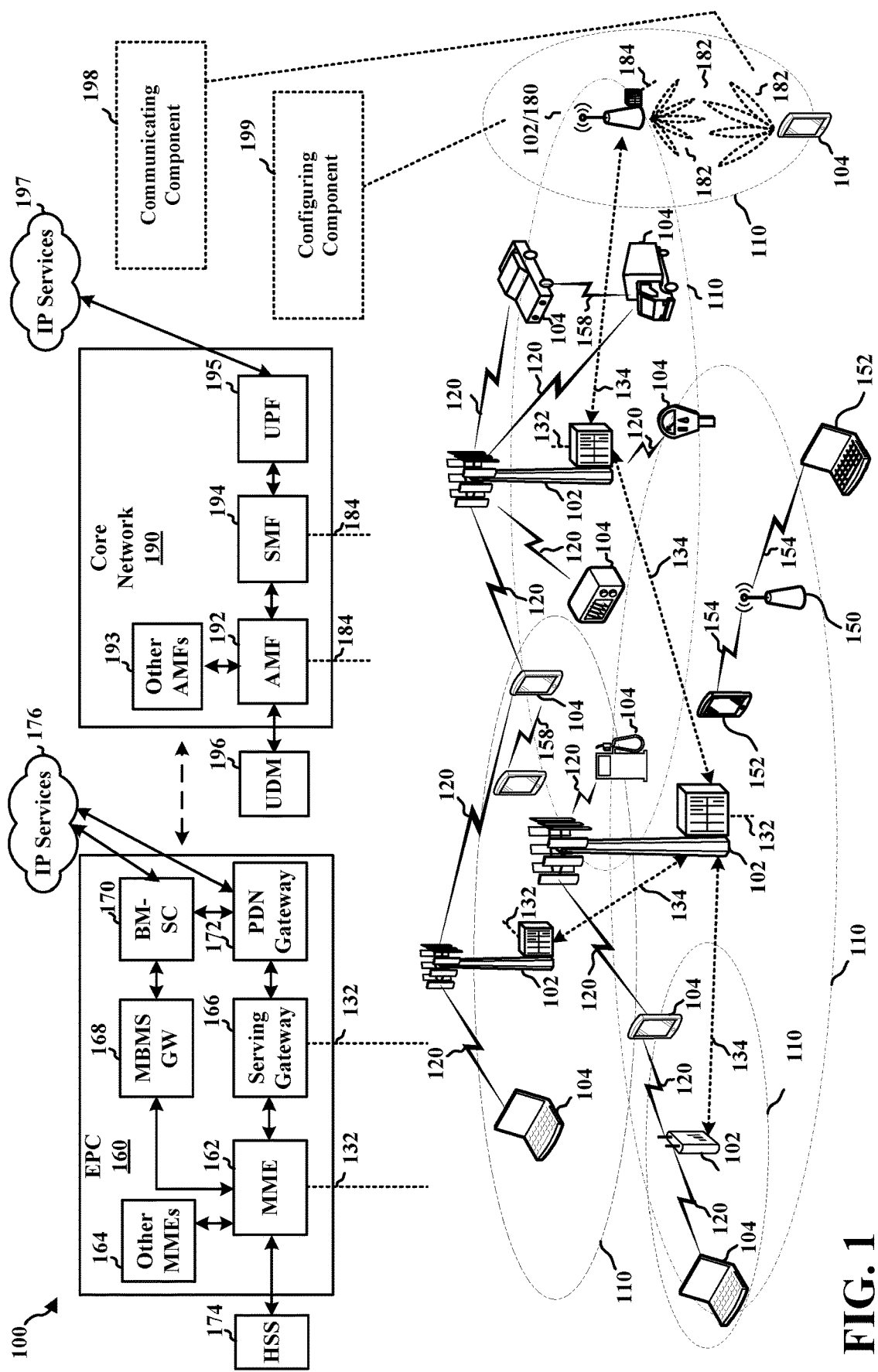
FIG. 1 is a diagram illustrating an example wireless communications system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those of ordinary skill in the art that these concepts may be practiced without these specific details. In some instances, structures and components are shown in block diagram form in order to avoid obscuring such concepts.

A user equipment (UE) may be equipped with multiple panels or arrays of antennas positioned at different positions in or on the UE or facing different directions for improved communication diversity. The UE may define one or more virtual antenna panels that are based on (for example, include) one or multiple (or portions of) the panels or arrays on the UE, where each virtual antenna panel may include (or may map to) one or more, or a portion of one or more, physical antenna panels. In some examples, all antennas in an antenna panel may share the same timing advance (TA) or power control (PC). In the following description, a physical antenna panel and a virtual antenna panel may both be referred to generally as an "antenna panel." As such, a reference to an antenna panel may refer to a physical antenna panel or a virtual antenna panel. Each antenna panel, whether physical or virtual, may be associated with a respective antenna panel identifier. In some examples, a UE with multiple antenna panels may or may not be able to concurrently receive multiple downlink beams using each of the multiple antenna panels. For example, the UE may not be able to receive one downlink beam using one antenna panel while concurrently receiving another downlink beam using another antenna panel. This may be due to resource limitations at the UE, prohibitive radio conditions at one of the antenna panels, or other possible considerations.

Various aspects relate generally to techniques for measuring beams and reporting beam measurements using multiple antenna panels. In some examples in which a UE is not able to concurrently receive multiple downlink beams, the UE may indicate that any received multiple downlink beams are to be received using the same antenna panel. In some other examples in which the UE may communicate with a base station using multiple antenna panels concurrently, the UE may determine a configuration of the multiple antenna panels to use in receiving and measuring downlink beams from the base station, and may subsequently transmit a beam report. The beam report may indicate one or more downlink beams, as well as indications of measurements or signal metrics associated with the one or more downlink beams. According to aspects of the present disclosure, the UE may further transmit, in the report, an antenna panel identifier associated with each of the measurements. The base station may, based on the beam report indicating antenna panel identifier(s), accordingly determine a number of antenna panels supported by the UE for concurrent communications. For example, the number of supported antenna panels may be one antenna panel or multiple antenna panels.

The base station may configure one or more parameters for communications with the UE based on the determined number of supported antenna panel(s) (for example, as determined based on the number of antenna panel identifier(s) indicated in the beam report). For example, if the UE reported multiple antenna panel identifiers in the beam report, the base station may configure one or more parameters for each of the activated antenna panels for communications with the UE. For example, the one or more parameters may include or indicate a transmitted precoding matrix indicator (TPMI), codebook, or the like, for the communications with the respective antenna panel. As such, the base station may configure uplink transmissions on multiple antenna panels of the UE to use one or more different communication parameters (for example, one or more different TPMIs, codebooks, or the like).

Particular implementations of the subject matter described in this disclosure may be implemented to realize one or more of the following potential advantages. In some aspects of the present disclosure, the UE providing the base station with information related to using multiple antenna panels, such as one or more antenna panel identifiers, may allow the base station to transmit to at least a portion of the multiple panels of the UE. This may improve communication throughput for the UE in communicating with the base station. In addition, in some aspects, allowing the UE to indicate availabilities or capabilities of multiple antenna panels through beam reporting may facilitate selectively enabling the antenna panels, which may be optimal for use in a communication environment, to avoid using antenna panels that may be subject to blockage or interference.

Several aspects of telecommunication systems will now be presented with reference to various apparatus and methods. These apparatus and methods will be described in the following detailed description and illustrated in the accompanying drawings by various blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

FIG. 1 is a diagram illustrating an example of a wireless communications system. The wireless communications system (also referred to as a wireless wide area network (WWAN)) includes base stations 102, UEs 104, an Evolved Packet Core (EPC) 160, and another core network 190 (for example, a 5G Core (5GC)). The base stations 102 may include macrocells (high power cellular base station) or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (for example, an S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (for example, handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (for example, through the EPC 160 or core network 190) with each other over third backhaul links 134 (for example, X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102a may have a coverage area 110a that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (for example, 5, 10, 15, 20, 100, 400 MHz, among other examples) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (for example, more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102a may operate in a licensed or an unlicensed frequency spectrum. When operating in an unlicensed frequency spectrum, the small cell 102a may employ NR and use the same 5 GHz unlicensed frequency spectrum as used by the Wi-Fi AP 150. The small cell 102a, employing NR in an unlicensed frequency spectrum, may boost coverage to or increase capacity of the access network.

A base station 102, whether a small cell 102a or a large cell (for example, macro base station), may include or be referred to as an eNB, gNodeB (gNB), or another type of base station. Some base stations, such as gNB 180 may operate in a traditional sub 6 GHz spectrum, in millimeter wave (mmW) frequencies, or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (for example, 3 GHz-300 GHz) has extremely high path loss and a short range. The mmW base station 180 may utilize beamforming to generate beamformed signals 182 (also referred to as "beams") with the UE 104 to compensate for the extremely high path loss and short range. The base station 180 and the UE 104 may each include a plurality of antennas, such as antenna elements, antenna panels, or antenna arrays to facilitate the beamforming. Though base station 102 and mmW base station 180 are separately shown, aspects described herein with respect to a base station 102 may relate to, and be implemented by, a mmW base station 180.

The base station 180 may transmit a beamformed signal to the UE 104 in one or more transmit directions. The UE 104 may receive the beamformed signal from the base station 180 in one or more receive directions. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station may include or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (for example, MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (for example, parking meter, gas pump, toaster, vehicles, heart monitor, among other examples). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in some aspects, the UE 104 may include a communicating component 198 configured to determine an antenna panel configuration of one or more antenna panels of the UE 104 for communicating with a base station 102 at least to receive, measure, or report downlink beams received from the base station 102. In some aspects, the base station 102 may include a configuring component 199 configured to receive a beam report from a UE 104 that indicates one or more antenna panel identifiers for communicating with the base station 102. Although the following description may be described in terms of 5G NR and related features, the concepts described herein may be applicable to other areas or wireless communication technologies, such as LTE, LTE-A, CDMA, global system for mobile communication (GSM), or future communications standards or technologies.

Figure 2A:
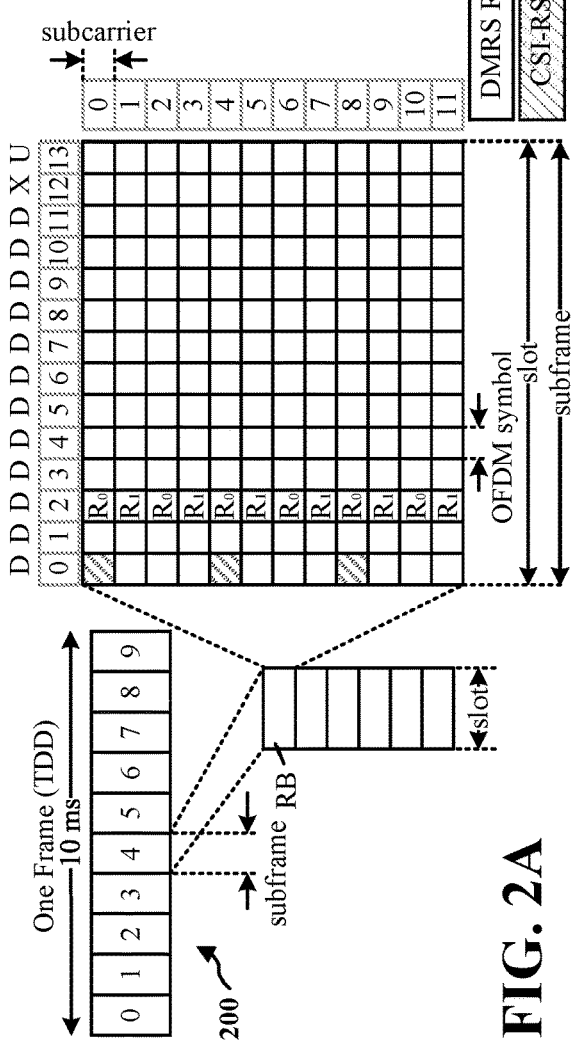
FIGS. 2A, 2B, 2C, and 2D are diagrams illustrating examples of a first fifth generation (5G)/new radio (NR) frame, downlink (DL) channels within a 5G/NR subframe, a second 5G/NR frame, and uplink (UL) channels within a 5G/NR subframe, respectively.
Figure 2B:
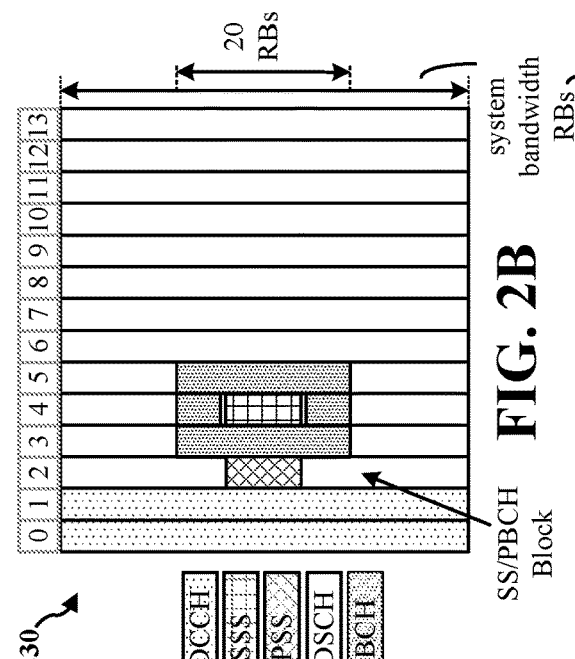
Figure 2C:
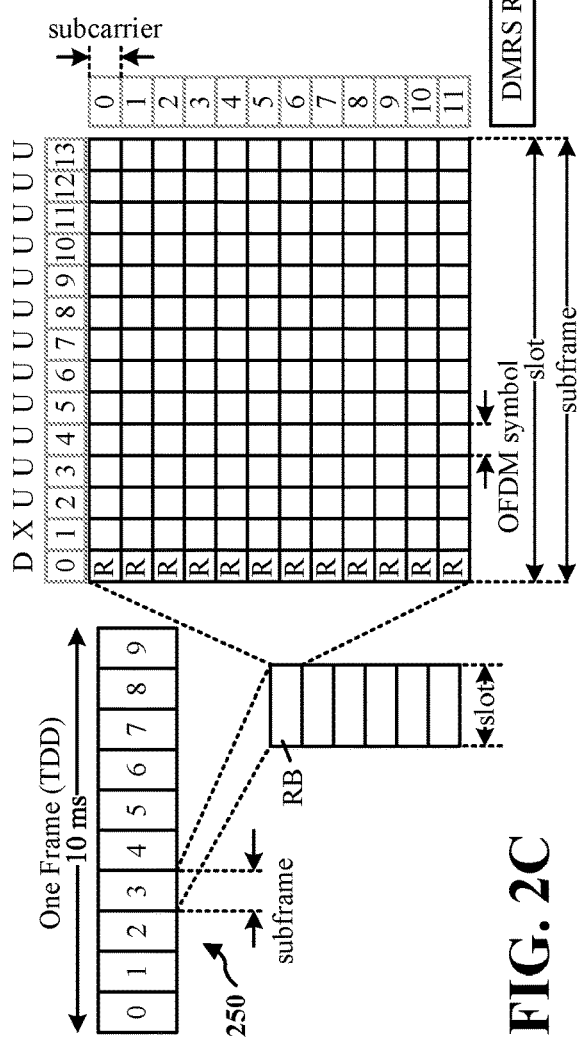
Figure 2D:
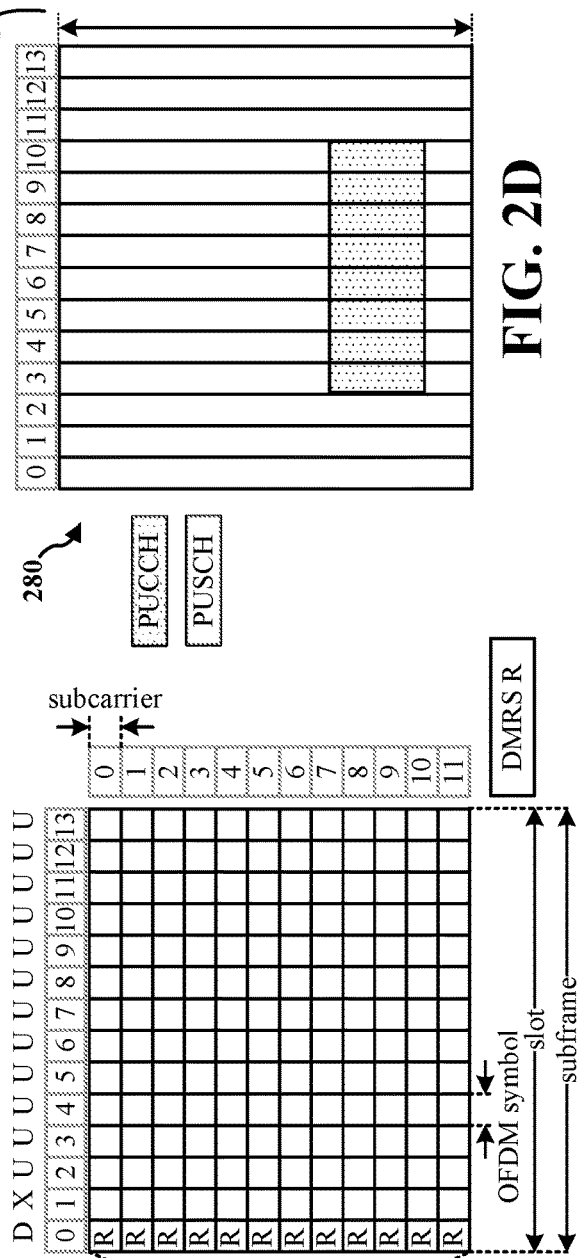

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or s emistatically/statically through radio resource control (RRC) signaling) through a received slot format indicator (SFI). Note that the description presented herein applies also to a 5G/NR frame structure that is TDD.

Other wireless communication technologies may have a different frame structure or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^\mu * 15$ kHz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=0 with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE may determine a physical cell identifier (PCI). Based on the PCI, the UE may determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat/request (HARQ) acknowledgement (ACK)/negative- ACK (NACK) feedback. The PUSCH carries data, and may additionally be used to carry a buffer status report (BSR), a power headroom report (PHR), or UCI.

Figure 3:
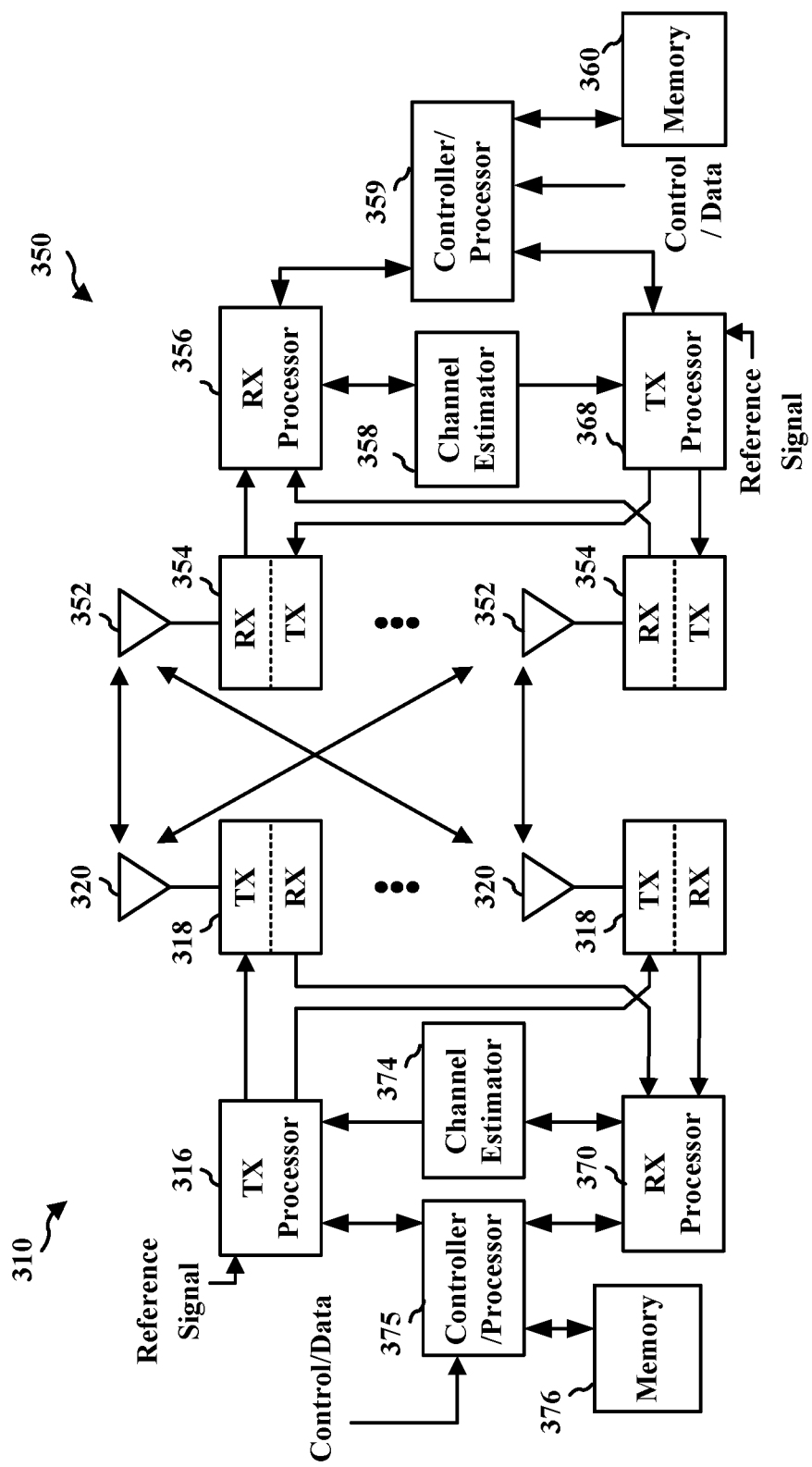
FIG. 3 is a diagram illustrating an example of a base station and an example of a user equipment (UE).

FIG. 3 is a block diagram of an example of a base station 310 and an example of a UE 350. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as MIB, SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat/request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (such as a pilot) in the time or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 may be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 310, the controller/processor 359 provides RRC layer functionality associated with system information (for example, MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 may be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK or NACK protocol to support HARQ operations.

At least one of the TX processor 368, the RX processor 356, and the controller/processor 359 may be configured to perform aspects in connection with communicating component 198 of FIG. 1.

At least one of the TX processor 316, the RX processor 370, and the controller/processor 375 may be configured to perform aspects in connection with configuring component 199 of FIG. 1.

In some wireless communication technologies, such as 5G NR, a UE may be configured to receive, measure, and report downlink beams from a base station, which may be performed as part of beam training, as described. In 5G NR, for example, a UE may be configured to report receiving or measuring of multiple received downlink beams in a group based beam report, but there is currently no mechanism to report an associated antenna panel identifier of an antenna panel at the UE over which the downlink beam is received or measured. Concurrent reception of uplink transmissions that are based on different downlink beams may be supported, and allowing the UE to report the antenna panel identifiers of multiple antenna panels used to receive and measure multiple downlink beams may enable the base station to determine support for multiple antenna panels at the UE 104 or configuration of uplink communications for the UE 104 based on the multiple antenna panels. For example, if the multiple downlink beams simultaneously receive uplink transmissions from the same UE beam on same antenna panel, there may be a single TPMI or codebook based PUSCH. If the multiple downlink beams simultaneously receive uplink transmissions from two UE beams on two antenna panels, there may be a two TPMIs corresponding to the two UE antenna panels. In this regard, it may be beneficial for the UE to report the antenna panel identifiers per reported downlink beam in a group based beam report so the base station may know whether there are multiple antenna panels or a single antenna panel or antenna port numbers per antenna panel at the UE. The base station may use this information to determine the number of TPMIs and may accordingly configure SRS port number in SRS resources to determine corresponding TPMI.

Figure 4:
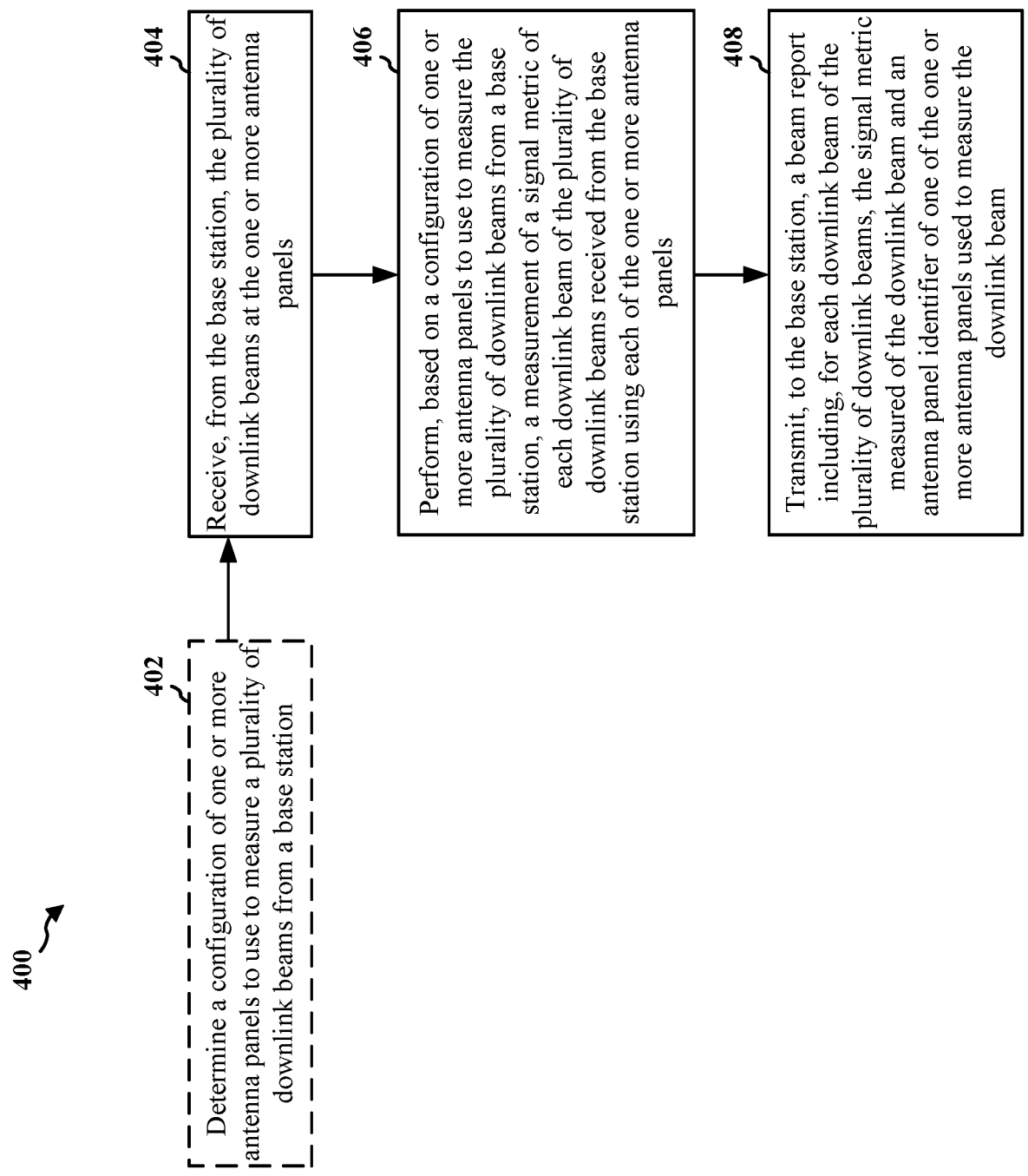
FIG. 4 is a flowchart illustrating an example of a method for determining a configuration of one or more antenna panels for receiving downlink beams in accordance with some aspects of the present disclosure.

FIG. 4 is a flowchart illustrating an example of a method 400 for determining a configuration of one or more antenna panels for receiving downlink beams in accordance with some aspects of the present disclosure. The method 400 may be performed by a UE (such as the UE 104, the wireless communication device 800, or the wireless communication device 900). In some examples, the method 400 may be performed by a portion of a UE 104, wireless communication device 800, or wireless communication device 900, such as including the memory 360, the memory 808, the TX processor 368, the RX processor 356, the controller/processor 359, the processor 806, or other components described herein.

Optionally, in block 402, the UE determines a configuration of one or more antenna panels to use to measure a plurality of downlink beams. In some implementations, panel configuring component 912, for example, in conjunction with the communicating component 198 (which may include or operate in conjunction with one or more of the TX processor 368, the RX processor 356, the controller/processor 359, the memory 360, the receiver or transmitter 354, the modem 802, the radio 804, the processor 806, the memory 808, the reception component 908, the transmission component 910, or other components described herein) may determine the configuration of one or more antenna panels to use to measure the plurality of downlink beams from the base station. In some examples, the UE 104 may include multiple antenna panels, as described, which may each be a physical antenna panel or other array of antennas positioned around the UE 104, virtual antenna panels that include one or more, or a portion of one or more, physical antenna panels, or the like In addition, each antenna panel may have an associated antenna panel identifier. In some examples, the antenna panel identifier may include a SRS resource set identifier, an identifier associated to a reference signal resource or resource set, an identifier assigned for a target reference signal resource or resource set, an identifier additionally configured in spatial relation information, or the like In any case, the antenna panel identifier may identify the antenna panel within the UE 104.

In some examples, communicating component 198 may determine the configuration of the one or more antenna panels based on various considerations, such as a detected environment at the UE 104, indications received from the base station 102, or the like For example, communicating component 198 may determine to use one or more of multiple antenna panels based on detected antenna blockage at the UE 104, such as by a hand or other object obstructing one of, or a portion of, a physical antenna panel or array. In another example, as described further herein, communicating component 198 may determine the configuration of the one or more antenna panels based on parameters received from the base station 102. In any case, for example, the configuration of the one or more antenna panels may correspond to antenna panel(s) that may be used to concurrently receive multiple downlink beams from the base station 102. In one example, as described further herein, communicating component 198 may receive the configuration from the base station 102.

In method 400, at block 404, UE 104 may receive, from the base station, the plurality of downlink beams at the one or more antenna panels. In an aspect, communicating component 198, for example, in conjunction with one or more of the TX processor 368, the RX processor 356, or the controller/processor 359, the memory 360, the receiver or transmitter 354, modem 802, radio 804, processor 806, memory 808, reception component 908, transmission component 910, or other components, may receive, from the base station (for example, base station 102), the plurality of downlink beams at the one or more antenna panels. For example, the UE 104 may use each of the one or more antenna panels to concurrently receive the multiple downlink beams at least in overlapping time domain resources (or, for example, in overlapping frequency resources).

In method 400, at block 406, UE 104 may perform, based on a configuration of one or more antenna panels to use to measure the plurality of downlink beams from a base station, a measurement of a signal metric of each downlink beam of the plurality of downlink beams received from the base station using each of the one or more antenna panels. In an aspect, beam measuring component 914, for example, in conjunction with communicating component 198, one or more of the TX processor 368, the RX processor 356, or the controller/processor 359, the memory 360, the receiver or transmitter 354, modem 802, radio 804, processor 806, memory 808, reception component 908, transmission component 910, or other components, may perform, based on the configuration of one or more antenna panels to use to measure the plurality of downlink beams from a base station, the measurement of the signal metric of each downlink beam of the plurality of downlink beams received from the base station using each of the one or more antenna panels. In an example, the configuration may include the configuration determined or otherwise received at block 402. For example, beam measuring component 914 may measure the signal metric as a received signal strength or quality (for example, reference signal received power (RSRP), reference signal received quality (RSRQ), received signal strength indicator (RSSI), signal-to-noise ratio (SNR), signal-to-interference-and-noise ratio (SINR), or the like) at one of the one or more antenna panels. Where multiple antenna panels are configured at the UE 104, beam measuring component 914 may measure the signal metric of multiple downlink beams concurrently at each of the multiple antenna panels.

In method 400, at block 408, UE 104 may transmit, to the base station, a beam report including, for each downlink beam of the plurality of downlink beams, the signal metric measured of the downlink beam and an antenna panel identifier of one of the one or more antenna panels used to measure the downlink beam. In some aspects, beam reporting component 916, for example, in conjunction with communicating component 198, one or more of the TX processor 368, the RX processor 356, or the controller/processor 359, the memory 360, the receiver or transmitter 354, modem 802, radio 804, processor 806, memory 808, reception component 908, transmission component 910, or other components, may transmit, to the base station (for example, base station 102), a beam report including, for each downlink beam of the plurality of downlink beams, the signal metric measured of the downlink beam and an antenna panel identifier of one of the one or more antenna panels used to measure the downlink beam. For example, beam reporting component 916 may generate a group based beam report that indicates multiple downlink beam measurements. Beam reporting component 916 may include, in the beam report, an indication of the antenna panel identifier of the antenna panel used to measure each downlink beam measurement. The indication of multiple antenna panel identifiers in the beam report may allow the base station 102 to determine that the UE 104 may concurrently communicate using multiple antenna panels, and the base station 102 may accordingly configure uplink communications for the UE 104, as described further herein, to use the multiple antenna panels and corresponding beams related to the measured downlink beams.

For example, in group based beam report, the UE 104 may report panel identifier(s) associated with each of multiple downlink (DL) beams or reference signals (RSs) that may be simultaneously received. Specifically, the UE 104 may report at least one UE panel identifier and corresponding measured metric per panel identifier for each DL RS in the reported set of DL RSs that may be simultaneously received. In a specific example, for CSI-RS #1 from TRP1, UE 104 reports panel #1 with RSRP #1 and panel #2 with RSRP #2, while for CSI-RS #2 from TRP2, UE 104 reports panel #3 with RSRP #3 and panel #4 with RSRP #4. Any two UE panels with one from (Panel #1, Panel #2) and the other one from (Panel #3, Panel #4) may simultaneously receive CSI-RS #1 and #2. In DL simultaneous receive (Rx), this may give the base station 102 multiple choices on the set of UE Rx beams for the same set of DL RSs, such that if one set of UE Rx beams fails, for example due to blocking, the base station 102 may quickly switch to the other set. In UL simultaneous Tx, the reported panel ID per DL RS and the antenna port number per panel ID may help the base station 102 identify the number of TPMI and the SRS port number in SRS resource to determine corresponding TPMI of Tx beams used by the UE 104, in some examples.

In addition, in some examples, beam reporting component 916 may report additional information along with the at least one UE panel identifier and corresponding measured metric per panel identifier for each DL RS in the reported set of DL RSs. In some examples, for simultaneous Rx on UE panel (s), the measured metric per panel ID may include L1-RSRP, L1-SINR, L1-RSRQ, or the like per panel identifier, as described. For simultaneous Tx on UE panel(s), for example, additional reported information may include available power headroom per panel identifier, which may include a maximum allowed UL Tx power for this panel, or a required UL Tx power for this panel, which may be determined by power control for this panel. In another example, for simultaneous Tx on UE panel(s), additional reported information may include power backoff per panel identifier, which may include a maximum UL Tx power for this panel determined by UE capability, or a maximum allowed UL Tx power for this panel, which may be due to maximum permissible exposure (MPE) limitation. In another example, for simultaneous Tx on UE panel(s), additional reported information may include estimated max UL RSRP per panel identifier, which may include a maximum allowed UL Tx power for this panel, or a pathloss for this panel, where the pathloss may be measured in DL. The base station 102 may also use this additional information in scheduling uplink transmissions for the UE 104, selecting a beam to use, indicating a transmit power to use, or the like.

Figure 5:
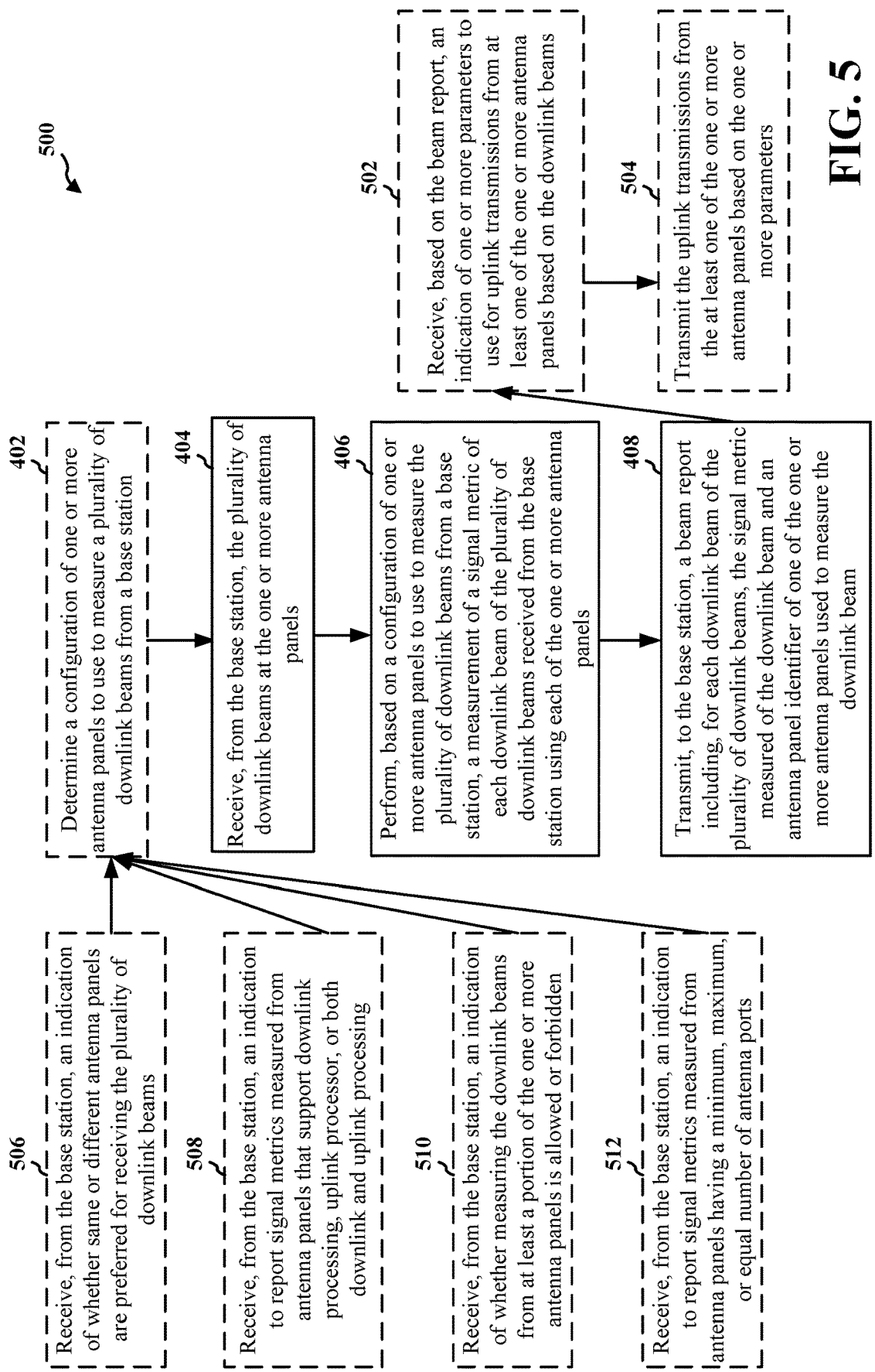
FIG. 5 is a flowchart illustrating an example of a method for determining a configuration of one or more antenna panels for receiving downlink beams or for uplink transmissions in accordance with some aspects of the present disclosure.

FIG. 5 is a flowchart illustrating an example of a method 500 for determining a configuration of one or more antenna panels for receiving downlink beams or for uplink transmissions in accordance with some aspects of the present disclosure. The method 500 may be performed by a UE (such as the UE 104, the wireless communication device 800, the wireless communication device 900). In some examples, the method 500 may be performed by a portion of a UE 104, wireless communication device 800, or wireless communication device 900, such as by the memory 360, memory 808, the TX processor 368, the RX processor 356, or the controller/processor 359, processor 806, or other components. Method 500 may include blocks 402, 404, 406, and 408 described in method 400 of FIG. 4 above and may include one or more additional optional blocks described below.

In method 500, optionally at block 502, UE 104 may receive, based on the beam report, an indication of one or more parameters to use for uplink transmission from at least one of the one or more antenna panels based on the downlink beams. In some aspects, communicating component 198, for example, in conjunction with one or more of the TX processor 368, the RX processor 356, or the controller/ processor 359, the memory 360, the receiver or transmitter 354, modem 802, radio 804, processor 806, memory 808, reception component 908, transmission component 910, or other components, may receive, based on the beam report, the indication of one or more parameters to use for uplink transmissions from at least one of the one or more antenna panels based on the downlink beams. For example, the beam report may include the beam report transmitted at block 406, described in connection with method 400 of FIG. 4 above, which may indicate multiple downlink beams concurrently measured by the UE 104 using one or more antenna panels, and an antenna panel identifier of the one or more antenna panels. As described, the base station 102 may use this information to determine the one or more parameters for uplink transmission, such as one or more TPMIs or codebooks for each of the one or more antenna panels, and may transmit the one or more parameters to use for uplink transmissions (for example, in an uplink resource grant).

In method 500, optionally at block 504, UE 104 may transmit the uplink transmissions from the at least one of the one or more antenna panels based on the one or more parameters. In some aspects, communicating component 198, for example, in conjunction with one or more of the TX processor 368, the RX processor 356, or the controller/processor 359, the memory 360, the receiver or transmitter 354, modem 802, radio 804, processor 806, memory 808, reception component 908, transmission component 910, or other components, may transmit the uplink transmissions from the at least one of the one or more antenna panels based on the one or more parameters. For example, communicating component 198 may transmit the uplink transmissions simultaneously, or otherwise in overlapping time periods, using the one or more antenna panels (for example, multiple different antenna panels) and using the TPMI, codebook, or the like indicated for one or more antenna panels.

In method 500, optionally at block 506, UE 104 may receive, from the base station, an indication of whether same or different antenna panels are preferred for receiving the plurality of downlink beams. In some aspects, communicating component 198, for example, in conjunction with one or more of the TX processor 368, the RX processor 356, or the controller/processor 359, the memory 360, the receiver or transmitter 354, modem 802, radio 804, processor 806, memory 808, reception component 908, transmission component 910, or other components, may receive, from the base station (for example, base station 102), the indication of whether same or different antenna panels are preferred for receiving the plurality of downlink beams (for example, to receive the multiple downlink reference signals transmitted using the multiple downlink beams). In some examples, panel configuring component 912 may determine the configuration of the one or more antenna panels (as described in block 402 of method 400 in FIG. 4) based on the indication, or may perform the measurement (as described in block 406 of method 400 in FIG. 4) based on the indication. For example, in some scenarios, using the same antenna panel identifier (for example, receiving the downlink beams and reporting using the one or more antenna panels based on a signal antenna panel identifier) may be preferred for reliability or power saving purposes, whereas using different antenna panel identifiers (for example, receiving the downlink beams and reporting using multiple antenna panels based on multiple antenna panel identifiers) may be preferred for increased throughput.

In method 500, optionally at block 508, UE 104 may receive, from the base station, an indication to report signal metrics measured from antenna panels that support downlink processing, uplink processing, or both downlink and uplink processing. In some aspects, communicating component 198, for example, in conjunction with one or more of the TX processor 368, the RX processor 356, or the controller/processor 359, the memory 360, the receiver or transmitter 354, modem 802, radio 804, processor 806, memory 808, reception component 908, transmission component 910, or other components, may receive, from the base station (for example, base station 102), the indication to report signal metrics measured from antenna panels that support downlink processing, uplink processing, or both downlink and uplink processing. In some examples, panel configuring component 912 may determine the configuration of the one or more antenna panels (as described in block 402 of method 400 in FIG. 4) based on the indication, or may perform the measurement (as described in block 406 of method 400 in FIG. 4) based on the indication. For example, panel configuring component 912 may determine, or perform measurements using, one or more antenna panels that may simultaneously receive multiple downlink beams and comply with the indication (for example, one or more antenna panels that support downlink processing, uplink processing, or both downlink and uplink processing, depending on the indication) and may configure the one or more antenna ports for receiving, measuring, and reporting the simultaneously received downlink beams to the base station. In some examples, the set of panel identifiers with each panel identifier supporting both DL and UL may be used for both simultaneous Rx and Tx, because some panel identifiers may be DL only.

In method 500, optionally at block 510, UE 104 may receive, from the base station, an indication of whether measuring the downlink beams from at least a portion of the one or more antenna panels is allowed or forbidden. In some aspects, communicating component 198, for example, in conjunction with one or more of the TX processor 368, the RX processor 356, or the controller/processor 359, the memory 360, the receiver or transmitter 354, modem 802, radio 804, processor 806, memory 808, reception component 908, transmission component 910, or other components, may receive, from the base station (for example, base station 102), the indication of whether measuring the downlink beams from at least a portion of the one or more antenna panels is allowed or forbidden. In some examples, panel configuring component 912 may determine the configuration of the one or more antenna panels (as described in block 402 of method 400 in FIG. 4) based on the indication, or may perform the measurement (as described in block 406 of method 400 in FIG. 4) based on the indication. For example, some panel identifiers may have MPE or inter-cell interference issue when they are also used for UL transmissions, and the indication may specify such antenna panel identifiers as forbidden. Panel configuring component 912, in some examples, may determine, or perform measurements using, one or more antenna panels that may simultaneously receive multiple downlink beams and comply with the indication (for example, to include one or more antenna panels that are indicated as allowed or not indicated as forbidden).

In method 500, optionally at block 512, UE 104 may receive, from the base station, an indication to report signal metrics measured from antenna panels having a minimum, maximum, or equal number of antenna ports. In some aspects, communicating component 198, for example, in conjunction with one or more of the TX processor 368, the RX processor 356, or the controller/processor 359, the memory 360, the receiver or transmitter 354, modem 802, radio 804, processor 806, memory 808, reception component 908, transmission component 910, or other components, may receive, from the base station (for example, base station 102), the indication to report signal metrics measured from antenna panels having a minimum, maximum, or equal number of antenna ports. In some examples, panel configuring component 912 may determine the configuration of the one or more antenna panels (as described in block 402 of method 400 in FIG. 4) based on the indication, or may perform the measurement (as described in block 406 of method 400 in FIG. 4) based on the indication. For example, this may depend on the base station 102 preference on reliability, throughput, power saving, simplified processing, or the like, as described above. Panel configuring component 912, in some examples, may determine, or perform measurements using, one or more antenna panels that may simultaneously receive multiple downlink beams and comply with the indication (for example, antenna panels having no more than the maximum number of antenna ports, at least the minimum number of antenna ports, or an equal number of antenna ports).

Figure 6:
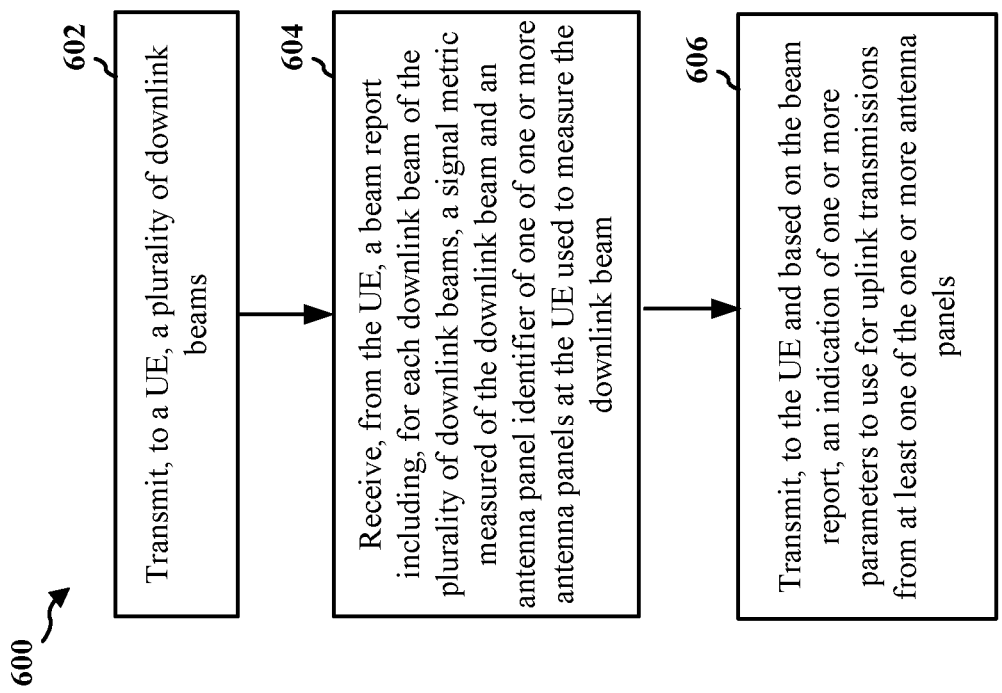
FIG. 6 is a flowchart illustrating an example of a method for receiving a beam report indicating one or more antenna panel identifiers of one or more antenna panels used to receive downlink beams in accordance with some aspects of the present disclosure.

In some examples, communicating component 198 may receive one or more of the above indications from the base station 102 in radio resource control (RRC) signaling, a media access control (MAC)-control element (CE) or a downlink control information (DCI) associated with the downlink reference signal transmitted using the downlink beam, or the like FIG. 6 is a flowchart illustrating an example of a method 600 for receiving a beam report indicating one or more antenna panel identifiers of one or more antenna panels used to receive downlink beams in accordance with some aspects of the present disclosure. The method 600 may be performed by a base station (such as the base station 102, the wireless communication device 800, or the wireless communication device 1000). In some examples, the method 600 may be performed by a portion of a base station 102, wireless communication device 800, or wireless communication device 1000, such as including the memory 360, the memory 808, the TX processor 368, the RX processor 356, the controller/processor 359, the processor 806, or other components described herein.

In block 602, the base station may transmit, to a UE, a plurality of downlink beams. In some implementations, beam generating component 1012, for example, in conjunction with the configuring component 199 (which may include or operate in conjunction with one or more of the TX processor 368, the RX processor 356, the controller/processor 359, the memory 360, the receiver or transmitter 354, the modem 802, the radio 804, the processor 806, the memory 808, the reception component 1008, the transmission component 1010, or other components described herein) may generate and transmit, to the UE (for example, UE 104), the plurality of downlink beams. In some examples, beam generating component 1012 may generate and transmit multiple downlink beams, which may include transmitting multiple DL RSs using the multiple downlink beams, to allow a UE 104 to measure and report signal metrics of the downlink beams. Beam generating component 1012 may generate and transmit the multiple downlink beams to be received by the UE 104 based on multiple receive beams (for example, as part of beam training). In this regard, in an example, beam generating component 1012 may transmit the multiple downlink beams to be received and measured before transmitting other communications (for example, downlink data communications) to the UE 104.

In block 604, the base station may receive, from the UE, the beam report including, for each downlink beam of the plurality of downlink beams, a signal metric measured of the downlink beam and an antenna panel identifier of one of one or more antenna panels at the UE used to measure the downlink beam. In some implementations, beam report processing component 1014, for example, in conjunction with the configuring component 199 (which may include or operate in conjunction with one or more of the TX processor 368, the RX processor 356, the controller/processor 359, the memory 360, the receiver or transmitter 354, the modem 802, the radio 804, the processor 806, the memory 808, the reception component 1008, the transmission component 1010, or other components described herein) may receive, from the UE (for example, UE 104), the beam report including, for each downlink beam of the plurality of downlink beams, the signal metric measured of the downlink beam and an antenna panel identifier of one of one or more antenna panels at the UE used to measure the downlink beam. As described, for example, the UE 104 may use one or more antenna panels to measure downlink beams from the base station 102 and may report the beam measurements along with antenna panel identifiers of the antenna panels used to measure the downlink beams. With this information, for example, the base station 102 may determine uplink communication parameters for the UE 104 to use the one or more antenna panels in uplink transmissions.

As described, for example, the beam report may include additional information along with the at least one UE panel identifier and corresponding measured metric per panel identifier for each DL RS in the reported set of DL RSs. In some examples, for simultaneous, or otherwise time-based overlapping, reception on UE panel(s), the measured metric per panel ID may include L1-RSRP, L1-SINR, L1-RSRQ, or the like per panel identifier, as described. For simultaneous, or otherwise time-based overlapping, transmission on UE panel(s), for example, additional reported information may include available power headroom per panel identifier, which may include a maximum allowed UL Tx power for this panel, power backoff per panel identifier, estimated maximum UL RSRP per panel identifier, or the like, and configuring component 199 may also use this additional information in scheduling uplink transmissions for the UE 104, selecting a beam to use, indicating a transmit power to use, or the like.

At block 606, the base station 102 may transmit, to the UE and based on the beam report, an indication of one or more parameters to use for uplink transmission from at least one of the one or more antenna panels. In some aspects, configuring component 199, for example, in conjunction with one or more of the TX processor 368, the RX processor 356, or the controller/processor 359, the memory 360, the receiver or transmitter 354, modem 802, radio 804, processor 806, memory 808, reception component 1008, transmission component 1010, or other components, may transmit, to the UE (for example, UE 104) and based on the beam report, the indication of one or more parameters to use for uplink transmissions from at least one of the one or more antenna panels, which may be based on the downlink beams. For example, the beam report may include the beam report received at block 604, which may indicate multiple downlink beams concurrently measured by the UE 104 using one or more antenna panels, and an antenna panel identifier of the one or more antenna panels. As described, beam report processing component 1014 may determine this information from the beam report, and configuring component 199 may use this information to determine the one or more parameters for uplink transmission using the one or more antenna panels, as described. The one or more parameters may include one or more TPMIs or codebooks for each of the one or more antenna panels to use in transmitting uplink communications. In some examples, the indication may specify the parameters along with the antenna panel identifier of the antenna panel that is to use the parameters.

Figure 7:
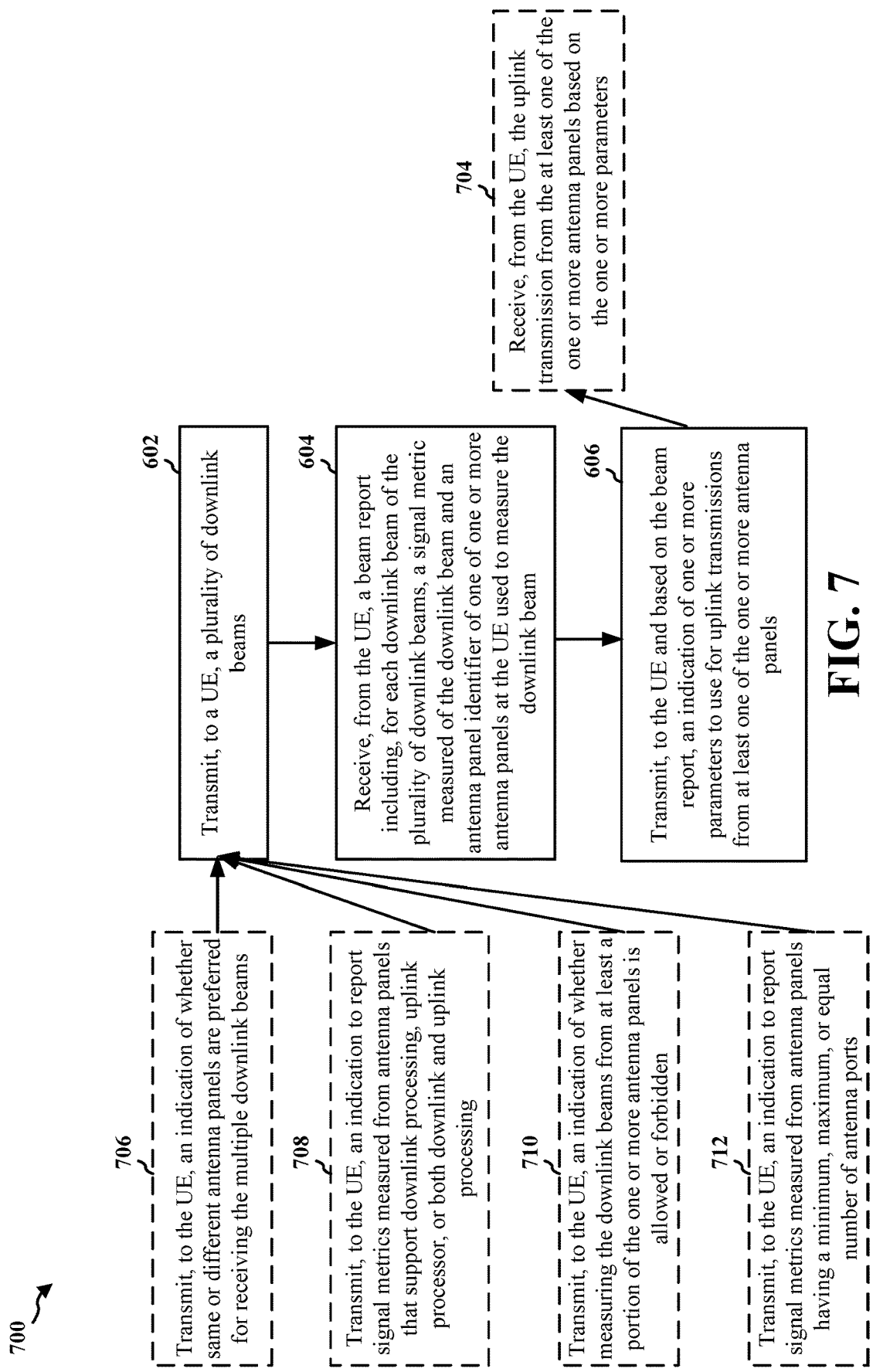
FIG. 7 is a flowchart illustrating an example of a method for receiving a beam report indicating one or more antenna panel identifiers of one or more antenna panels used to receive downlink beams or for configuring uplink transmissions in accordance with some aspects of the present disclosure.

FIG. 7 is a flowchart illustrating an example of a method 700 for receiving a beam report indicating one or more antenna panel identifiers of one or more antenna panels used to receive downlink beams or for configuring uplink transmissions in accordance with some aspects of the present disclosure. The method 700 may be performed by a base station (such as the base station 102, the wireless communication device 800, the wireless communication device 1000). In some examples, the method 700 may be performed by a portion of a base station 102, wireless communication device 800, or wireless communication device 1000, such as by the memory 360, memory 808, the TX processor 368, the RX processor 356, or the controller/processor 359, processor 806, or other components. Method 700 may include blocks 602, 604, and 606 described in method 600 of FIG. 6 above and may include one or more additional optional blocks described below.

In method 700, optionally at block 704, UE 104 may receive, from the UE, the uplink transmissions from the at least one of the one or more antenna panels based on the one or more parameters. In some aspects, configuring component 199, for example, in conjunction with one or more of the TX processor 368, the RX processor 356, or the controller/processor 359, the memory 360, the receiver or transmitter 354, modem 802, radio 804, processor 806, memory 808, reception component 1008, transmission component 1010, or other components, may receive, from the UE (for example, UE 104) the uplink transmission from the at least one of the one or more antenna panels based on the one or more parameters. For example, configuring component 199 may receive the uplink transmissions simultaneously using the one or more antenna panels and using the TPMI, codebook, or the like indicated for one or more antenna panels.

In method 700, optionally at block 706, the base station 102 may transmit, to the UE, an indication of whether same or different antenna panels are preferred for receiving the multiple downlink beams. In some aspects, configuring component 199, for example, in conjunction with one or more of the TX processor 368, the RX processor 356, or the controller/processor 359, the memory 360, the receiver or transmitter 354, modem 802, radio 804, processor 806, memory 808, reception component 1008, transmission component 1010, or other components, may transmit, to the UE (for example, UE 104), the indication of whether same or different antenna panels are preferred for receiving the multiple downlink beams (for example, to receive the multiple downlink reference signals transmitted using the multiple downlink beams). In some examples, the UE 104 may use this indication to determine the configuration of one or more antenna panels for receiving, measuring, and reporting multiple downlink beams, as described above.

In method 700, optionally at block 708, the base station 102 may transmit, to the UE, an indication to report signal metrics measured from antenna panels that support downlink processing, uplink processing, or both downlink and uplink processing. In some aspects, configuring component 199, for example, in conjunction with one or more of the TX processor 368, the RX processor 356, or the controller/processor 359, the memory 360, the receiver or transmitter 354, modem 802, radio 804, processor 806, memory 808, reception component 1008, transmission component 1010, or other components, may transmit, to the UE (for example, UE 104), the indication to report signal metrics measured from antenna panels that support downlink processing, uplink processing, or both downlink and uplink processing. In some examples, the UE 104 may use this indication to determine the configuration of one or more antenna panels for receiving, measuring, and reporting multiple downlink beams, as described above.

In method 700, optionally at block 710, the base station 102 may transmit, to the UE, an indication of whether measuring the downlink beams from at least a portion of the one or more antenna panels is allowed or forbidden. In some aspects, configuring component 199, for example, in conjunction with one or more of the TX processor 368, the RX processor 356, or the controller/processor 359, the memory 360, the receiver or transmitter 354, modem 802, radio 804, processor 806, memory 808, reception component 1008, transmission component 1010, or other components, may transmit, to the UE (for example, UE 104), the indication of whether measuring the downlink beams from at least a portion of the one or more antenna panels is allowed or forbidden. In some examples, the UE 104 may use this indication to determine the configuration of one or more antenna panels for receiving, measuring, and reporting multiple downlink beams, as described above.

In method 700, optionally at block 712, the base station 102 may transmit, to the UE, an indication to report signal metrics measured from antenna panels having a minimum, maximum, or equal number of antenna ports. In some aspects, configuring component 199, for example, in conjunction with one or more of the TX processor 368, the RX processor 356, or the controller/processor 359, the memory 360, the receiver or transmitter 354, modem 802, radio 804, processor 806, memory 808, reception component 1008, transmission component 1010, or other components, may transmit, to the UE (for example, UE 104), the indication to report signal metrics measured from antenna panels having a minimum, maximum, or equal number of antenna ports. In some examples, the UE 104 may use this indication to determine the configuration of one or more antenna panels for receiving, measuring, and reporting multiple downlink beams, as described above.

Figure 8:
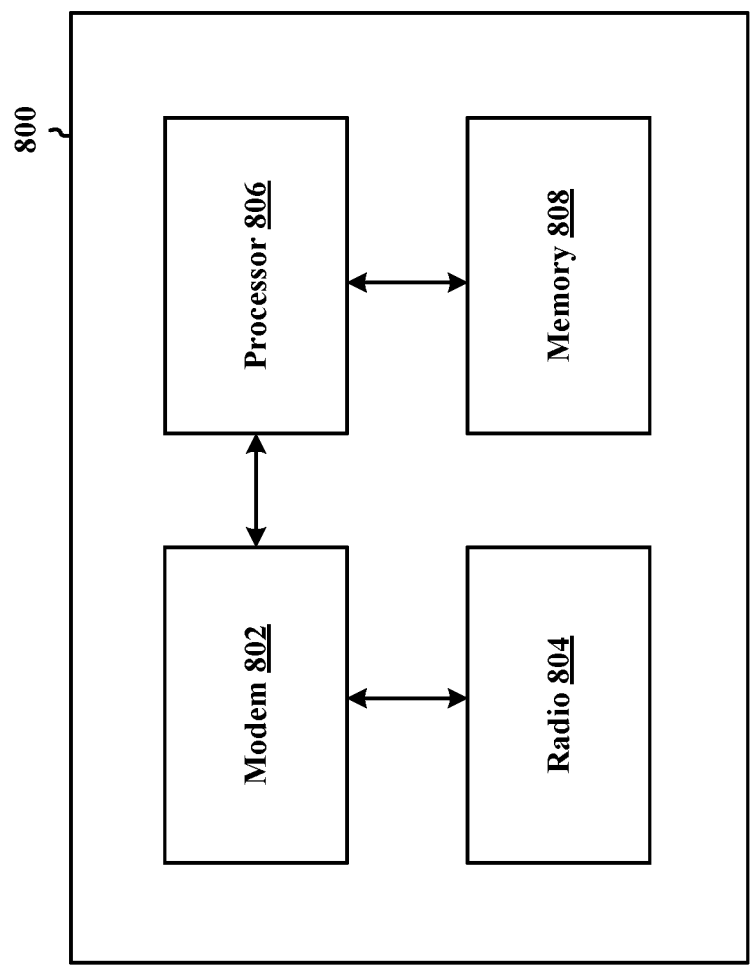
FIG. 8 shows a block diagram of an example of a wireless communication device that supports indicating a panel identifier in reporting received beams in accordance with some aspects of the present disclosure.

In some examples, configuring component 199 may transmit one or more of the above indications to the UE 104 in RRC signaling, a MAC-CE or DCI associated with the downlink reference signal transmitted using the downlink beam, or the like FIG. 8 shows a block diagram of an example of a wireless communication device 800 that supports indicating a panel identifier in reporting received beams in accordance with some aspects of the present disclosure. In some implementations, the wireless communication device 800 may be an example of a device for use in a UE such as one of the UEs 104 described with reference to FIG. 1. In some implementations, the wireless communication device 800 may be an example of a device for use in an base station such as the base station 102 described with reference to FIG. 1. The wireless communication device 800 is capable of transmitting (or outputting for transmission) and receiving wireless communications (for example, in the form of wireless packets). For example, the wireless communication device may be configured to transmit and receive packets in the form of packet data convergence protocol (PDCP) protocol data units (PDUs) and medium access control (MAC) PDUs, or the like.

The wireless communication device 800 may be, or may include, a chip, system on chip (SoC), chipset, package or device that includes one or more modems 802, (collectively "the modem 802"), which may include a WWAN modem (for example, a 3GPP 4G LTE or 5G compliant modem). In some implementations, the wireless communication device 800 also includes one or more radios 804 (collectively "the radio 804"). In some implementations, the wireless communication device 800 further includes one or more processors, processing blocks or processing elements 806 (collectively "the processor 806") and one or more memory blocks or elements 808 (collectively "the memory 808").

The modem 802 may include an intelligent hardware block or device such as, for example, an application-specific integrated circuit (ASIC) among other possibilities. The modem 802 is generally configured to implement a PHY layer. For example, the modem 802 is configured to modulate packets and to output the modulated packets to the radio 804 for transmission over the wireless medium. The modem 802 is similarly configured to obtain modulated packets received by the radio 804 and to demodulate the packets to provide demodulated packets. In addition to a modulator and a demodulator, the modem 802 may further include digital signal processing (DSP) circuitry, automatic gain control (AGC), a coder, a decoder, a multiplexer and a demultiplexer. For example, while in a transmission mode, data obtained from the processor 806 is provided to a coder, which encodes the data to provide encoded bits. The encoded bits are then mapped to points in a modulation constellation (using a selected MCS) to provide modulated symbols. The modulated symbols may then be mapped to a number NSS of spatial streams or a number NSTS of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 804. In implementations involving beamforming, the modulated symbols in the respective spatial streams are precoded via a steering matrix prior to their provision to the IFFT block.

While in a reception mode, digital signals received from the radio 804 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The de-multiplexed bits may then be descrambled and provided to the MAC layer (the processor 806) for processing, evaluation or interpretation.

The radio 804 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 800 may include, or be coupled with, multiple transmit antennas (each with a corresponding transmit chain) and multiple receive antennas (each with a corresponding receive chain). The symbols output from the modem 802 are provided to the radio 804, which then transmits the symbols via the coupled antennas. Similarly, symbols received via the antennas are obtained by the radio 804, which then provides the symbols to the modem 802.

The processor 806 may include an intelligent hardware block or device such as, for example, a processing core, a processing block, a central processing unit (CPU), a microprocessor, a micro-controller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 806 processes information received through the radio 804 and the modem 802, and processes information to be output through the modem 802 and the radio 804 for transmission through the wireless medium. For example, the processor 806 may implement a control plane and MAC layer configured to perform various operations related to the generation and transmission of PDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 806 may generally control the modem 802 to cause the modem to perform various operations described above.

The memory 808 may include tangible storage media such as random-access memory (RAM) or read-only memory (ROM), or combinations thereof. The memory 808 also may store non-transitory processor- or computer-executable software (SW) code containing instructions that, when executed by the processor 806, cause the processor to perform various operations described herein for wireless communication, including the generation, transmission, reception and interpretation of PDUs, frames or packets. For example, various functions of components disclosed herein, or various blocks or steps of a method, operation, process or algorithm disclosed herein, may be implemented as one or more modules of one or more computer programs.

Figure 9:
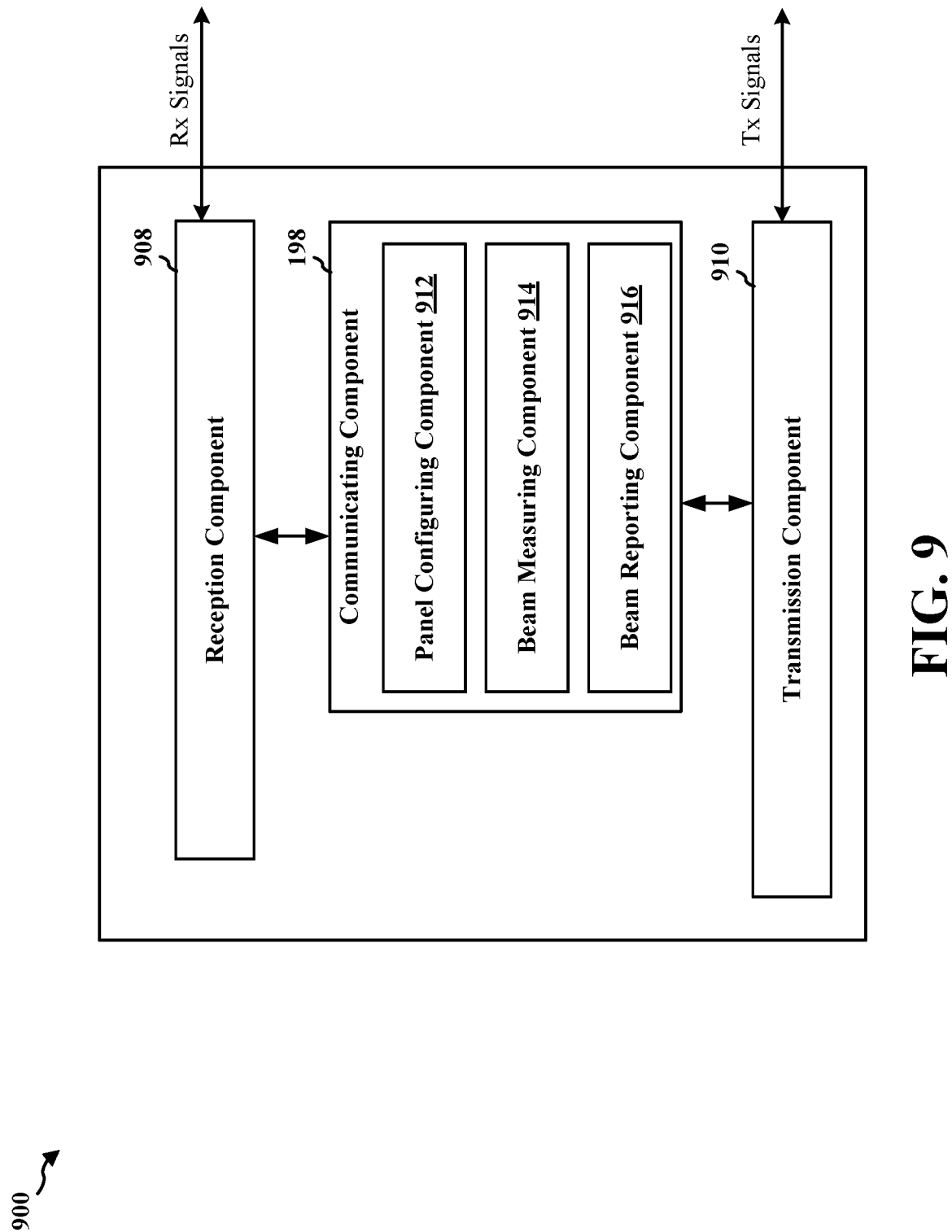
FIG. 9 shows a block diagram of an example of a wireless communication device that supports indicating a panel identifier in reporting received beams in accordance with some aspects of the present disclosure.

FIG. 9 shows a block diagram of an example of a wireless communication device 900 that supports indicating a panel identifier in reporting received beams in accordance with some aspects of the present disclosure. In some implementations, the wireless communication device 900 is configured to perform any of the processes 400 or 500 described above with reference to FIGS. 4 and 5, respectively. In some implementations, the wireless communication device 900 may be an example of an implementation of the wireless communication device 800 described above with reference to FIG. 8. For example, the wireless communication device 900 may be a chip, SoC, chipset, package or device that includes at least one processor and at least one modem (for example, a Wi-Fi (IEEE 802.11) modem or a cellular modem).

The wireless communication device 900 includes a reception component 908, a communicating component 198, and a transmission component 910. The communicating component 198 may further include a panel configuring component 912, a beam measuring component 914, and a beam reporting component 916. Portions of one or more of the components 912, 914, and 916, may be implemented at least in part in hardware or firmware. In some implementations, at least one of the components 912, 914, and 916, is implemented at least in part as software stored in a memory (such as the memory 808). For example, portions of one or more of the components 912, 914, and 916, may be implemented as non-transitory instructions or code executable by a processor (such as the processor 806) to perform the functions or operations of the respective component.

The reception component 908 is configured to receive RX signals from another wireless communication device. The communicating component 198 is configured to report downlink beam measurements performed by one or more antenna panels via transmission component 910, as described herein. Moreover, as described, panel configuring component 912 may determine a configuration of one or more antenna panels for receiving multiple downlink beams, beam measuring component 914 may measure the multiple beams using the one or more antenna panels, or beam reporting component 916 may report the beam measurements including an antenna panel identifier for each of the one or more antenna panels used to measure the multiple downlink beams.

Figure 10:
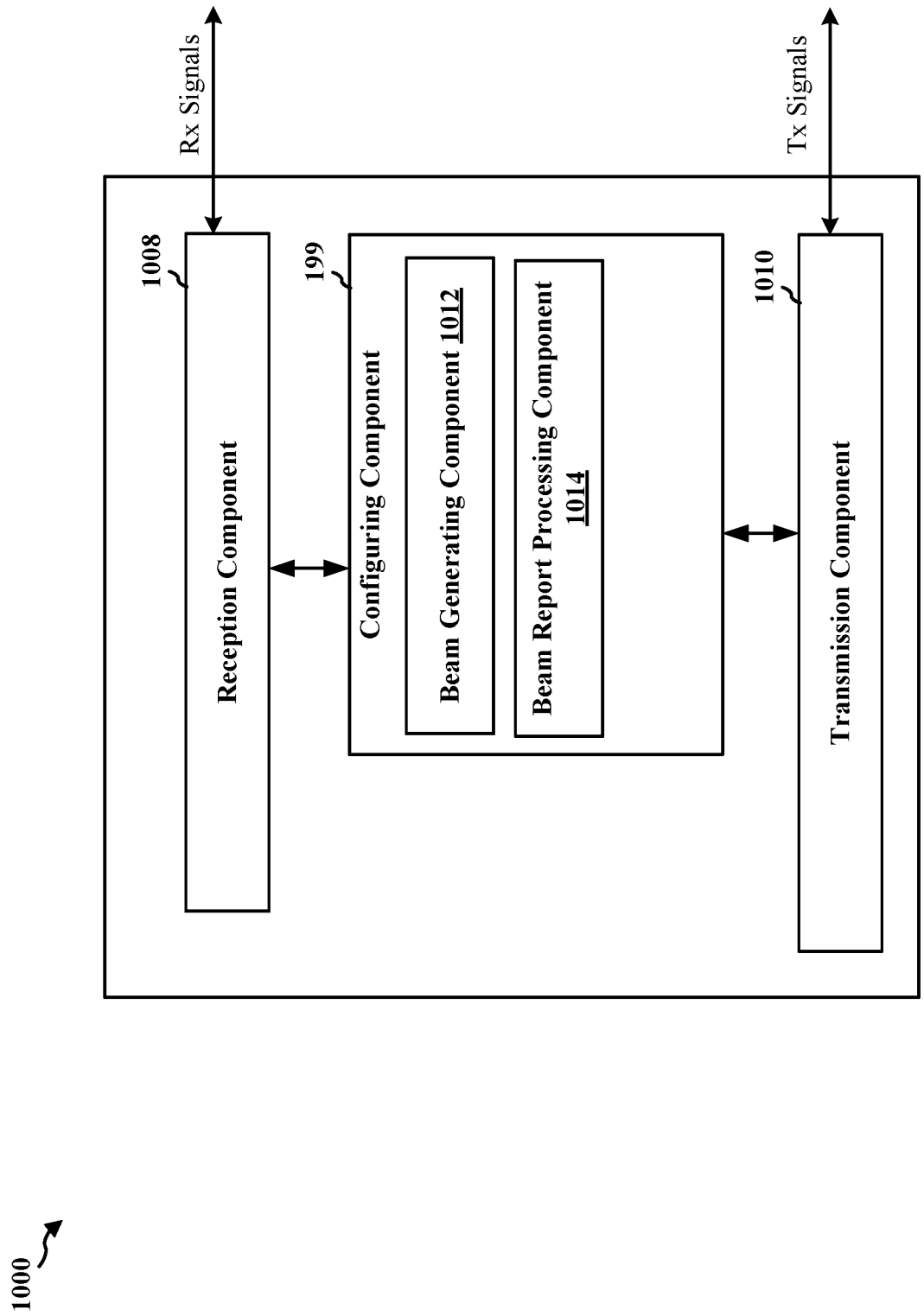
FIG. 10 shows a block diagram of an example of a wireless communication device that supports indicating a panel identifier in reporting received beams in accordance with some aspects of the present disclosure.

FIG. 10 shows a block diagram of an example of a wireless communication device 1000 that supports indicating a panel identifier in reporting received beams in accordance with some aspects of the present disclosure. In some implementations, the wireless communication device 1000 is configured to perform processes 600 and 700 described above with reference to FIGS. 6 and 7. In some implementations, the wireless communication device 1000 may be an example of an implementation of the wireless communication device 800 described above with reference to FIG. 8. For example, the wireless communication device 1000 may be a chip, SoC, chipset, package or device that includes at least one processor and at least one modem (for example, a Wi-Fi (IEEE 802.11) modem or a cellular modem).

The wireless communication device 1000 includes a reception component 1008, a configuring component 199, and a transmission component 1010. The configuring component 199 may further include a beam generating component 1012 and a beam report processing component 1014. Portions of one or more of the components 1012 or 1014 may be implemented at least in part in hardware or firmware. In some implementations, at least one of the components 1012 or 1014 is implemented at least in part as software stored in a memory (such as the memory 808). For example, portions of one or more of the components 1012 or 1014 may be implemented as non-transitory instructions or code executable by a processor (such as the processor 806) to perform the functions or operations of the respective component.

The reception component 1008 is configured to receive RX signals from another wireless communication device. In some implementations, the RX signals may include uplink signals received from a UE 104. The configuring component 199 is configured to receive a beam report of multiple beam measurements performed by one or more antenna panels via a beam generating component 1012 that may generate and transmit multiple downlink beams or a beam report processing component 1014 that may receive and process a beam report to determine beam measurements and a number of antenna panels used to perform the beam measurements.

The following aspects are illustrative only and aspects thereof may be combined with aspects of other embodiments or teaching described herein, without limitation.

Aspect 1 is a method for wireless communication including determining a configuration of one or more antenna panels to use to measure a plurality of downlink beams from a base station, receiving, from the base station, the plurality of downlink beams at the one or more antenna panels, performing a measurement of a signal metric of each downlink beam of the plurality of downlink beams received from the base station using each of the one or more antenna panels, and transmitting, to the base station, a beam report including, for each downlink beam of the plurality of downlink beams, the signal metric measured of the downlink beam and an antenna panel identifier of one of the one or more antenna panels used to measure the downlink beam.

In Aspect 2, the method of Aspect 1 includes where the plurality of downlink beams correspond to downlink beams that may be concurrently received using the one or more antenna panels.

In Aspect 3, the method of any of Aspects 1 or 2 includes where the beam report includes, for the downlink beam, a plurality of signal metrics measured using each of a plurality of antenna panels and, for each signal metric of the plurality of signal metrics, the respective antenna panel identifier associated with the plurality of antenna panels that generates the signal metric.

In Aspect 4, the method of any of Aspects 1 to 3 includes where the plurality of downlink beams are received from different TRPs of the base station.

In Aspect 5, the method of any of Aspects 1 to 4 includes receiving, based on transmitting the beam report, an indication of one or more parameters to use for uplink transmissions from at least one of the one or more antenna panels, and transmitting the uplink transmissions from the at least one of the one or more antenna panels based on the one or more parameters.

In Aspect 6, the method of Aspect 5 includes where the one or more parameters include, for each of the one or more antenna panels, at least one of a TPMI or a codebook to use for a corresponding one of the one or more antenna panels.

In Aspect 7, the method of any of Aspects 1 to 6 includes where the signal metric for each downlink beam of the plurality of downlink beams includes at least one of a RSRP, SNR, or RSRQ, measured for the downlink beam.

In Aspect 8, the method of any of Aspects 1 to 7 includes where the beam report includes, for each antenna panel identifier, at least one of an indication of an available power headroom, an indication of a power backoff, or an estimated maximum uplink RSRP, for the one of the one or more antenna panels identified by the antenna panel identifier.

In Aspect 9, the method of any of Aspects 1 to 8 includes receiving, from the base station, an indication of whether same or different antenna panels are preferred for receiving the plurality of downlink beams, where determining the configuration of the one or more antenna panels is based on the indication.

In Aspect 10, the method of any of Aspects 1 to 9 includes receiving, from the base station, an indication to report signal metrics measured from antenna panels that support downlink processing, uplink processing, or both downlink and uplink processing, where determining the configuration of the one or more antenna panels is based on the indication.

In Aspect 11, the method of any of Aspects 1 to 10 includes receiving, from the base station, an indication of whether measuring the downlink beams from at least a portion of the one or more antenna panels is allowed or forbidden, where determining the configuration of the one or more antenna panels is based on the indication.

In Aspect 12, the method of any of Aspects 1 to 11 includes where receiving, from the base station, an indication to report signal metrics measured from antenna panels having a minimum, maximum, or equal number of antenna ports, where determining the configuration of the one or more antenna panels includes determining, based on the indication, a number of antenna ports for each of the one or more antenna panels.

In Aspect 13, the method of any of Aspects 1 to 12 includes where each of the one or more antenna panels is a virtual antenna panel that corresponds to one or more, or a portion of one or more, physical antenna arrays.

Aspect 14 is a method for wireless communication including transmitting, to a UE, a plurality of downlink beams, and receiving, from the UE, a beam report including, for each downlink beam of the plurality of downlink beams, a signal metric measured of the downlink beam and an antenna panel identifier of one of one or more antenna panels at the UE used to measure the downlink beam.

In Aspect 15, the method of Aspect 14 includes where the plurality of downlink beams correspond to downlink beams that may be concurrently received using the one or more antenna panels.

In Aspect 16, the method of any of Aspects 14 or 15 includes where the beam report includes, for the downlink beam, a plurality of signal metrics measured using each of a plurality of antenna panels at the UE and, for each signal metric of the plurality of signal metrics, the antenna panel identifier of one of the plurality of antenna panels that generates the signal metric.

In Aspect 17, the method of any of Aspects 14 to 16 includes where the plurality of downlink beams are transmitted from different TRPs.

In Aspect 18, the method of any of Aspects 14 to 17 includes transmitting, to the UE and based on the beam report, an indication of one or more parameters to use for uplink transmissions from at least one of the one or more antenna panels, and receiving, from the UE, the uplink transmissions from the at least one of the one or more antenna panels based on the one or more parameters.

In Aspect 19, the method of Aspect 18 includes where the one or more parameters include, for each of the one or more antenna panels, at least one of a TPMI or a codebook for a corresponding one of the one or more antenna panels.

In Aspect 20, the method of any of Aspects 18 or 19 includes configuring a SRS port for each of the one or more antenna panels, where determining the TPMI corresponding to each of the one or more antenna panels is further based on the SRS port in a SRS resource received for the uplink transmissions.

In Aspect 21, the method of any of Aspects 14 to 20 includes where the signal metric for each downlink beam of the plurality of downlink beams includes at least one of a RSRP, SNR, or RSRQ, measured for the downlink beam.

In Aspect 22, the method of any of Aspects 14 to 21 includes where the beam report includes, for each antenna panel identifier, at least one of an indication of an available power headroom, an indication of a power backoff, or an estimated maximum uplink RSRP, for the one of the one or more antenna panels identified by the antenna panel identifier.

In Aspect 23, the method of any of Aspects 14 to 22 includes transmitting, to the UE, an indication of whether same or different antenna panels are preferred for receiving the plurality of downlink beams.

In Aspect 24, the method of any of Aspects 14 to 23 includes transmitting, to the UE, an indication to report signal metrics measured from antenna panels that support downlink processing, uplink processing, or both downlink and uplink processing, and receiving, from the UE and based on the plurality of downlink beams, uplink transmissions from each of the one or more antenna panels based on the indication.

In Aspect 25, the method of any of Aspects 14 to 24 includes transmitting, to the UE, an indication of whether measuring the downlink beams from at least a portion of the one or more antenna panels is allowed or forbidden.

In Aspect 26, the method of any of Aspects 14 to 25 includes transmitting, to the UE, an indication to report signal metrics measured from antenna panels having of a minimum, maximum, or equal number of antenna ports.

In Aspect 27, the method of any of Aspects 14 to 26 includes where each of the one or more antenna panels is a virtual antenna panel that corresponds to one or more, or a portion of one or more, physical antenna arrays.

Aspect 28 is a method for wireless communication at a UE including receiving, from a base station, a configuration indicating a set of multiple antenna panels, of a plurality of antenna panels associated with the UE, with which to perform measurements of a plurality of downlink beams, receiving, from the base station, the plurality of downlink beams, each of the plurality of downlink beams being concurrently received by one or more antenna panels of the set of multiple antenna panels, performing, based on the configuration, one or more measurements of each of the received plurality of downlink beams, and transmitting, to the base station, a beam report including, for each of the plurality of downlink beams, the one or more measurements of the downlink beam and one or more antenna panel identifiers that respectively indicate the one or more antenna panels over which the downlink beam is received.

In Aspect 29, the method of Aspect 28 includes where the plurality of downlink beams are received from different TRPs of the base station.

In Aspect 30, the method of any of Aspects 28 or 29 includes where the one or more antenna panels include multiple antenna panels, wherein the beam report includes, for each of the received plurality of downlink beams, a plurality of measurements measured using each of the multiple antenna panels and, for each measurement of the plurality of measurements, a respective antenna panel identifier associated with the multiple antenna panels that generates the measurement.

In Aspect 31, the method of any of Aspects 28 to 30 includes receiving, based on transmitting the beam report, an indication of one or more parameters to use for uplink transmissions from at least one of the one or more antenna panels, and transmitting the uplink transmissions from the at least one of the one or more antenna panels based on the one or more parameters.

In Aspect 32, the method of any of Aspects 28 to 31 includes where the one or more measurements for each downlink beam of the plurality of downlink beams includes at least one of a RSRP, SNR, or RSRQ, measured for the downlink beam.

In Aspect 33, the method of any of Aspects 28 to 32 includes where the beam report includes, for each of the one or more antenna panel identifiers, at least one of an indication of an available power headroom, an indication of a power backoff, or an estimated maximum uplink RSRP, for the one of the one or more antenna panels identified by the antenna panel identifier.

In Aspect 34, the method of any of Aspects 28 to 33 includes receiving, from the base station, an indication of whether same or different antenna panels are preferred for receiving the plurality of downlink beams, where the configuration of the set of multiple antenna panels is based on the indication.

In Aspect 35, the method of any of Aspects 28 to 34 includes receiving, from the base station, an indication to report signal metrics measured from antenna panels having a minimum, maximum, or equal number of antenna ports, where performing the one or more measurements is based on the indication and based on a number of antenna ports for each of the one or more antenna panels.

Aspect 36 is a method for wireless communication by a base station including transmitting, to a UE, a plurality of downlink beams, where the plurality of downlink beams correspond to downlink beams that may be concurrently received using the one or more antenna panels, receiving, from the UE, a beam report including, for each downlink beam of the plurality of downlink beams, one or more measurements of the downlink beam and an antenna panel identifier of one of one or more antenna panels at the UE used to measure the downlink beam, and transmitting, to the UE and based on the beam report, an indication of one or more parameters to use for uplink transmissions from at least one of the one or more antenna panels.

In Aspect 37, the method of Aspect 36 includes where the plurality of downlink beams are transmitted from different TRPs.

In Aspect 38, the method of any of Aspects 36 or 37 includes where the one or more antenna panels include a plurality of antenna panels, wherein the beam report includes, for the downlink beam, a plurality of measurements measured using each of the plurality of antenna panels at the UE and, for each measurement of the plurality of measurements, a respective antenna panel identifier of one of the plurality of antenna panels that generates the measurement.

In Aspect 39, the method of any of Aspects 36 to 38 includes transmitting, to the UE and based on the beam report, an indication of one or more parameters to use for uplink transmissions from at least one of the one or more antenna panels, and receiving, from the UE, the uplink transmissions from the at least one of the one or more antenna panels based on the one or more parameters.

In Aspect 40, the method of any of Aspects 36 to 39 includes where the one or more measurements for each downlink beam of the plurality of downlink beams includes at least one of a RSRP, SNR, or RSRQ, measured for the downlink beam.

In Aspect 41, the method of any of Aspects 36 to 40 includes where the beam report includes, for each antenna panel identifier, at least one of an indication of an available power headroom, an indication of a power backoff, or an estimated maximum uplink RSRP, for the one of the one or more antenna panels identified by the antenna panel identifier.

In Aspect 42, the method of any of Aspects 36 to 41 includes transmitting, to the UE, an indication of whether same or different antenna panels are preferred for receiving the plurality of downlink beams.

In Aspect 43, the method of any of Aspects 36 to 42 includes transmitting, to the UE, an indication to report the one or more measurements measured from antenna panels having of a minimum, maximum, or equal number of antenna ports.

Aspect 44 is an apparatus for wireless communication including a transceiver, a memory configured to store instructions, and one or more processors communicatively coupled with the transceiver and the memory. The one or more processors are configured to execute the instructions to perform the operations of one or more methods in Aspects 1 to 43.

Aspect 45 is an apparatus for wireless communication including means for performing the operations of one or more methods in Aspects 1 to 43.

Aspect 46 is a computer-readable medium including code executable by one or more processors to perform the operations of one or more methods in Aspects 1 to 43.

The specific order or hierarchy of blocks in the processes/flowcharts disclosed is an illustration of example approaches. Based upon design preferences, the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person of ordinary skill in the art to practice the various aspects described herein. Various modifications to these aspects will be readily apparent to those of ordinary skill in the art, and the generic principles defined herein may be applied to other aspects. The claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may include A only, B only, C only, A and B only, A and C only, B and C only, or A and B and C, where any such combinations may contain one or more members of any of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication, comprising:
a transceiver;
a memory configured to store instructions; and
one or more processors communicatively coupled with the transceiver and the memory, wherein the one or more processors are configured to:
receive, from a base station, a configuration indicating a set of multiple antenna panels, of a plurality of antenna panels associated with the apparatus, via which to perform measurements of a plurality of downlink beams;
receive, from the base station, the plurality of downlink beams, each of the plurality of downlink beams being concurrently received by a subset of antenna panels of the set of multiple antenna panels;

perform, based on the configuration, one or more measurements of each of the received plurality of downlink beams for each of the subset of antenna panels via which the respective downlink beam is received; and transmit, to the base station, a beam report including, for each of the plurality of downlink beams for each of the subset of antenna panels via which the downlink beam is received, the one or more measurements of the downlink beam and one or more parameters corresponding to one or more antenna panel identifiers that respectively indicate the subset of antenna panels via which the downlink beam is received.

2. The apparatus of claim 1, wherein the plurality of downlink beams are concurrently received from different transmission/reception points (TRPs) of the base station using different antenna panels of the set of antenna panels.

3. The apparatus of claim 1, wherein the beam report includes, for each of the received plurality of downlink beams, a plurality of measurements measured using each of the subset of antenna panels and, for each measurement of the plurality of measurements, a respective antenna panel identifier associated with the subset of antenna panels that generate the measurement.

4. The apparatus of claim 1, wherein the one or more processors are further configured to:
receive, based on transmitting the beam report, an indication of one or more uplink transmission parameters to use for uplink transmissions from at least one of the subset of antenna panels; and
transmit the uplink transmissions from the at least one of the subset of antenna panels based on the one or more uplink transmission parameters.

5. The apparatus of claim 1, wherein the one or more measurements for each downlink beam of the plurality of downlink beams includes at least one of a reference signal received power (RSRP), signal-to-noise ratio (SNR), or reference signal received quality (RSRQ), measured for the downlink beam.

6. The apparatus of claim 1, wherein the beam report includes, for each of the one or more antenna panel identifiers, at least one of an indication of an available power headroom, an indication of a power backoff, or an estimated maximum uplink reference signal received power (RSRP), for the one of the subset of antenna panels identified by the antenna panel identifier.

7. The apparatus of claim 1, wherein the one or more processors are further configured to receive, from the base station, an indication of whether same or different antenna panels are preferred for receiving the plurality of downlink beams, wherein the configuration of the set of multiple antenna panels is based on the indication.

8. The apparatus of claim 1, wherein the one or more processors are further configured to receive, from the base station, an indication to report signal metrics measured from antenna panels having a minimum, maximum, or equal number of antenna ports, wherein the one or more processors are configured to perform the one or more measurements based on the indication and based on a number of antenna ports for each of the subset of antenna panels.

9. A method for wireless communication at a user equipment (UE), comprising:
receiving, from a base station, a configuration indicating a set of multiple antenna panels, of a plurality of antenna panels associated with the UE, via which to perform measurements of a plurality of downlink beams;

receiving, from the base station, the plurality of downlink beams, each of the plurality of downlink beams being concurrently received by a subset of antenna panels of the set of multiple antenna panels;

performing, based on the configuration, one or more measurements of each of the received plurality of downlink beams for each of the subset of antenna panels via which the respective downlink beam is received; and transmitting, to the base station, a beam report including, for each of the plurality of downlink beams for each of the subset of antenna panels via which the downlink beam is received, the one or more measurements of the downlink beam and one or more parameters corresponding to one or more antenna panel identifiers that respectively indicate the subset of antenna panels via which the downlink beam is received.

10. The method of claim 9, wherein the plurality of downlink beams are concurrently received from different transmission/reception points (TRPs) of the base station using different antenna panels of the set of antenna panels.

11. The method of claim 9, wherein the beam report includes, for each of the received plurality of downlink beams, a plurality of measurements measured using each of the subset of antenna panels and, for each measurement of the plurality of measurements, a respective antenna panel identifier associated with the subset of antenna panels that generate the measurement.

12. The method of claim 9, further comprising:
receiving, based on transmitting the beam report, an indication of one or more parameters to use for uplink transmissions from at least one of the subset of antenna panels; and
transmitting the uplink transmissions from the at least one of the subset of antenna panels based on the one or more parameters.

13. The method of claim 9, wherein the one or more measurements for each downlink beam of the plurality of downlink beams includes at least one of a reference signal received power (RSRP), signal-to-noise ratio (SNR), or reference signal received quality (RSRQ), measured for the downlink beam.

14. The method of claim 9, wherein the beam report includes, for each of the one or more antenna panel identifiers, at least one of an indication of an available power headroom, an indication of a power backoff, or an estimated maximum uplink reference signal received power (RSRP), for the one of the subset of antenna panels identified by the antenna panel identifier.

15. The method of claim 9, further comprising receiving, from the base station, an indication of whether same or different antenna panels are preferred for receiving the plurality of downlink beams, wherein the configuration of the set of multiple antenna panels is based on the indication.

16. The method of claim 9, further comprising receiving, from the base station, an indication to report signal metrics measured from antenna panels having a minimum, maximum, or equal number of antenna ports, wherein performing the one or more measurements is based on the indication and based on a number of antenna ports for each of the subset of antenna panels.

17. An apparatus for wireless communication, comprising:
a transceiver;
a memory configured to store instructions; and one or more processors communicatively coupled with the transceiver and the memory, wherein the one or more processors are configured to:
- transmit, for a user equipment (UE), a configuration indicating a set of multiple antenna panels, of a plurality of antenna panels associated with the UE, via which to perform measurements of a plurality of downlink beams;
- transmit the plurality of downlink beams, wherein the plurality of downlink beams correspond to downlink beams that may be concurrently received using a subset of antenna panels of the set of multiple of antenna panels;
- receive, from the UE, a beam report including, for each downlink beam of the plurality of downlink beams for each of the subset of antenna panels via which the downlink beam is received, one or more measurements of the respective downlink beam and one or more parameters corresponding to one or more antenna panel identifiers that respectively indicate the subset of antenna panels at the UE used to measure the downlink beam; and
- transmit, to the UE and based on the beam report, an indication of one or more parameters to use for uplink transmissions from at least one of the one or more antenna panels.

18. The apparatus of claim 17, wherein the plurality of downlink beams are transmitted from different transmission/reception points (TRPs).

19. The apparatus of claim 17, wherein the beam report includes, for the downlink beam, a plurality of measurements measured using each of the subset of antenna panels at the UE and, for each measurement of the plurality of measurements, a respective antenna panel identifier of one of the subset of antenna panels that generates the measurement.

20. The apparatus of claim 17, wherein the one or more processors are further configured to:
- transmit, to the UE and based on the beam report, an indication of one or more parameters to use for uplink transmissions from at least one of the subset of antenna panels; and
- receive, from the UE, the uplink transmissions from the at least one of the subset of antenna panels based on the one or more parameters.

21. The apparatus of claim 17, wherein the one or more measurements for each downlink beam of the plurality of downlink beams includes at least one of a reference signal received power (RSRP), signal-to-noise ratio (SNR), or reference signal received quality (RSRQ), measured for the downlink beam.

22. The apparatus of claim 17, wherein the beam report includes, for each antenna panel identifier, at least one of an indication of an available power headroom, an indication of a power backoff, or an estimated maximum uplink reference signal received power (RSRP), for the one of the subset of antenna panels identified by the antenna panel identifier.

23. The apparatus of claim 17, wherein the one or more processors are further configured to transmit, to the UE, an indication of whether same or different antenna panels are preferred for receiving the plurality of downlink beams.

24. The apparatus of claim 17, wherein the one or more processors are further configured to transmit, to the UE, an indication to report measurements from antenna panels having of a minimum, maximum, or equal number of antenna ports.

25. A method for wireless communication by a base station, comprising:
- transmitting, for a user equipment (UE), a configuration indicating a set of multiple antenna panels, of a plurality of antenna panels associated with the UE, via which to perform measurements of a plurality of downlink beams;
- transmitting a plurality of downlink beams, wherein the plurality of downlink beams correspond to downlink beams that may be concurrently received using a subset of antenna panels of the set of multiple of antenna panels;
- receiving, from the UE, a beam report including, for each downlink beam of the plurality of downlink beams for each of the subset of antenna panels via which the downlink beam is received, one or more measurements of the respective downlink beam and one or more parameters corresponding to one or more antenna panel identifiers that respectively indicate the subset of antenna panels at the UE used to measure the downlink beam; and
- transmitting, to the UE and based on the beam report, an indication of one or more parameters to use for uplink transmissions from at least one of the one or more antenna panels.

26. The method of claim 25, wherein the plurality of downlink beams are transmitted from different transmission/reception points (TRPs).

27. The method of claim 25, wherein the beam report includes, for the downlink beam, a plurality of measurements measured using each of the subset of antenna panels at the UE and, for each measurement of the plurality of measurements, a respective antenna panel identifier of one of the subset of antenna panels that generates the measurement.

28. The method of claim 25, further comprising:
- transmitting, to the UE and based on the beam report, an indication of one or more parameters to use for uplink transmissions from at least one of the subset of antenna panels; and
- receiving, from the UE, the uplink transmissions from the at least one of the subset of antenna panels based on the one or more parameters.

29. The method of claim 25, wherein the one or more measurements for each downlink beam of the plurality of downlink beams includes at least one of a reference signal received power (RSRP), signal-to-noise ratio (SNR), or reference signal received quality (RSRQ), measured for the downlink beam.

30. The method of claim 29, wherein the beam report includes, for each antenna panel identifier, at least one of an indication of an available power headroom, an indication of a power backoff, or an estimated maximum uplink reference signal received power (RSRP), for the one of the one or more antenna panels identified by the antenna panel identifier.

31. The apparatus of claim 1, wherein the one or more parameters include, for each of the one or more antenna panel identifiers, one or more antenna port numbers that respectively indicate one or more antenna ports of a corresponding one or more of the subset of antenna panels via which the downlink beam is received.

32. The method of claim 9, wherein the one or more parameters include, for each of the one or more antenna panel identifiers, one or more antenna port numbers that respectively indicate one or more antenna ports of a corresponding one or more of the subset of antenna panels via which the downlink beam is received.

33. The apparatus of claim 17, wherein the one or more parameters include, for each of the one or more antenna panel identifiers, one or more antenna port numbers that respectively indicate one or more antenna ports of a corresponding one or more of the subset of antenna panels at the UE used to measure the downlink beam.

34. The method of claim 25, wherein the one or more parameters include, for each of the one or more antenna panel identifiers, one or more antenna port numbers that respectively indicate one or more antenna ports of a corresponding one or more of the subset of antenna panels at the UE used to measure the downlink beam.

35. The apparatus of claim 1, wherein the one or more parameters include the one or more antenna panel identifiers.

36. The method of claim 9, wherein the one or more parameters include the one or more antenna panel identifiers.

37. The apparatus of claim 17, wherein the one or more parameters include the one or more antenna panel identifiers.

38. The method of claim 25, wherein the one or more parameters include the one or more antenna panel identifiers.

\* \* \* \* \*